(12) United States Patent
Miyoshi et al.

(10) Patent No.: US 8,401,100 B2
(45) Date of Patent: Mar. 19, 2013

(54) TRANSMISSION APPARATUS AND TRANSMISSION METHOD

(75) Inventors: Kenichi Miyoshi, Kanagawa (JP); Akihiko Nishio, Kanagawa (JP); Daichi Imamura, Kanagawa (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/316,249

(22) Filed: Dec. 9, 2011

(65) Prior Publication Data

US 2012/0128087 A1    May 24, 2012

Related U.S. Application Data

(63) Continuation of application No. 11/722,856, filed as application No. PCT/JP2005/023808 on Dec. 26, 2005, now abandoned.

(30) Foreign Application Priority Data

| Dec. 28, 2004 | (JP) | 2004-381796 |
| Jun. 28, 2005 | (JP) | 2005-188424 |
| Jul. 25, 2005 | (JP) | 2005-213930 |

(51) Int. Cl.
    *H04K 1/10* (2006.01)
(52) U.S. Cl. ........ 375/260; 375/267; 375/299; 375/347; 375/346; 375/348; 375/349
(58) Field of Classification Search .................. 375/260, 375/267, 299, 347, 346, 349, 348
    See application file for complete search history.

(56) References Cited

U.S. PATENT DOCUMENTS

| 7,023,265 | B1 | 4/2006 | Helard |
| 2002/0172184 | A1 | 11/2002 | Kim |
| 2002/0191535 | A1 | 12/2002 | Sugiyama |
| 2003/0137926 | A1* | 7/2003 | Joo et al. ............. 370/203 |
| 2004/0086027 | A1 | 5/2004 | Shattil |
| 2004/0165675 | A1 | 8/2004 | Ito |
| 2004/0190640 | A1* | 9/2004 | Dubuc et al. ............. 375/260 |
| 2005/0101264 | A1 | 5/2005 | Farlow |
| 2007/0135049 | A1* | 6/2007 | Yoshii et al. ............. 455/42 |
| 2009/0154608 | A1 | 6/2009 | Yoon |

FOREIGN PATENT DOCUMENTS

| JP | 2003-509959 | 3/2003 |
| JP | 2003-218759 | 7/2003 |
| JP | 2004-343282 | 12/2004 |
| JP | 2004-350242 | 12/2004 |

OTHER PUBLICATIONS

PCT International Search Report dated Feb. 7, 2006.

(Continued)

*Primary Examiner* — Kabir A Timory
(74) *Attorney, Agent, or Firm* — Dickinson Wright PLLC

(57) ABSTRACT

A wireless receiving apparatus capable of efficiently removing interference signals in a multicarrier communication. In a mobile station incorporating this wireless receiving apparatus, a selecting part selects a plurality of the same symbols in accordance with a mapping pattern established at the time of generating OFDM symbols in a base station. A correlation value calculating part determines correlation values between the subcarriers of the same symbols to generate an R-matrix, and further determines an inverse matrix of the R-matrix. An MMSE processing part performs an MMSE processing to determine a weight from both a P-vector received from a channel estimating part and the inverse matrix of the R-matrix received from the correlation value calculating part. Multipliers multiply each of the symbols selected by the selecting part by the weight determined by the MMSE processing part. A combining part combines the symbols as multiplied by the weight.

7 Claims, 25 Drawing Sheets

OTHER PUBLICATIONS

Noriyuki Maeda, et al.; "Performance of Forward Link Broadband OFCDM Packet Wireless Access using MMSE Combining Scheme Based on SIR Estimation," Vehicular Technology Conference (VTC) Spring 2002, 55th, IEEE, 2002, vol. 2, pp. 1045-1049.

Luciano Medina et al.; "Proposal of OFDM System with Data Repetition," Vehicular Technology Conference (VTC) Fall 2000, 52nd, IEEE, 2000, vol. 1, pp. 352-357.

Japanese Office Action dated Jun. 14, 2011.

M. Schnell et al., "Interleaved FDMA: Equalization and Coded Performance in Mobile Radio Applications", Proceedings of the 1999 IEEE International Conference on Communications, ICC'99, Jan. 1999, vol. 3, pp. 1939-1944.

European Search Report dated Jan. 11, 2013.

* cited by examiner

TRANSMISSION APPARATUS AND TRANSMISSION METHOD

This is a continuation application of application Ser. No. 11/722,856 filed Jun. 26, 2007, which is a national stage of PCT/JP2005/023808 filed Dec. 26, 2005, which is based on Japanese Application No. 2004-381796 filed Dec. 28, 2004, Japanese Application No. 2005-188424 filed Jun. 28, 2005, and Japanese Application No. 2005-213930 filed Jul. 25, 2005, the entire contents of each of which are incorporated by reference herein.

TECHNICAL FIELD

The present invention relates to a radio receiving apparatus, radio transmitting apparatus and interference signal cancellation method.

BACKGROUND ART

In recent years, in radio communication, particularly in mobile communication, various kinds of information such as images and data as well as speeches are subjected to transmission. From now on, it is expected that demands further increase for transmitting various types of content, and it naturally follows that the need for high-speed transmission is expected to further increase. However, when high-speed transmission is performed in mobile communication, the influence of delayed waves by multipath is not negligible, and transmission performance deteriorates due to frequency selective fading.

Multicarrier communication such as OFDM (Orthogonal Frequency Division Multiplexing) is focused as one of counter techniques of frequency selective fading. Multicarrier communication is a technique of transmitting data using a plurality of carriers (subcarriers) with transmission rates suppressed to such an extent that frequency selective fading does not occur, which results in high-speed transmission. Particularly, the OFDM scheme utilizes a plurality of subcarriers which are orthogonal each other and where data is arranged, provides high frequency use efficiency in multicarrier communication, can be implemented with relatively simple hardware, is particularly focused and is variously studied.

Meanwhile, in mobile communication, an adaptive array antenna (hereinafter, referred to as AAA) technique is studied for adaptively controlling reception directivity by multiplying signals received by a plurality of antennas with weighting coefficients (weight). This AAA technique makes it possible to cancel an interference signal from a received signal by controlling the weight adaptively using MMSE (Minimum Mean Square Error).

Then, for example, Patent Document 1 discloses a technique for estimating an optimum weight promptly and precisely in a receiving apparatus where the OFDM scheme and AAA technique are combined.

Patent Document 1: Japanese Patent Application Laid-Open No. 2003-218759

DISCLOSURE OF INVENTION

Problems to be Solved by the Invention

The AAA technique can cancel interference signals corresponding to the number of antennas minus one in principle. In other words, when the number of interference signal sources is N, the receiving apparatus disclosed in Patent Document 1 requires N+1 antennas. Further, when signals transmitted from interference signal sources are received in the receiving apparatus in a multipath environment, where M is the number of multipath for interference signal sources, the receiving apparatus disclosed in Patent Document 1 requires a large number (N×M+1) of antennas.

Thus, the receiving apparatus disclosed in Patent Document 1 requires a large number of antennas for canceling interference signals, it naturally follows that it is actually difficult to mount the receiving apparatus disclosed in Patent Document 1 in a radio communication mobile station apparatus (referred to as a mobile station) for which miniaturization is increasingly demanded in recent years.

It is an object of the invention to provide, in multicarrier communication, a radio receiving apparatus, radio transmitting apparatus and interference signal cancellation method that enable canceling interference signals efficiently.

Means for Solving the Problem

A radio receiving apparatus of the invention adopts a configuration including a receiving section that receives a multicarrier signal including a plurality of subcarriers on which a plurality of same symbols are mapped; and an interference cancellation section that cancels an interference signal from the multicarrier signal using the plurality of same symbols.

Advantageous Effect of the Invention

According to the invention, it is possible to cancel interference signals efficiently in multicarrier communication.

BEST MODE FOR CARRYING OUT THE INVENTION

The operating principle of the present invention will be described. Further, although, in the following, an OFDM scheme is described as an example of a multicarrier communication scheme, the invention is not limited to the OFDM scheme.

Figure 1:
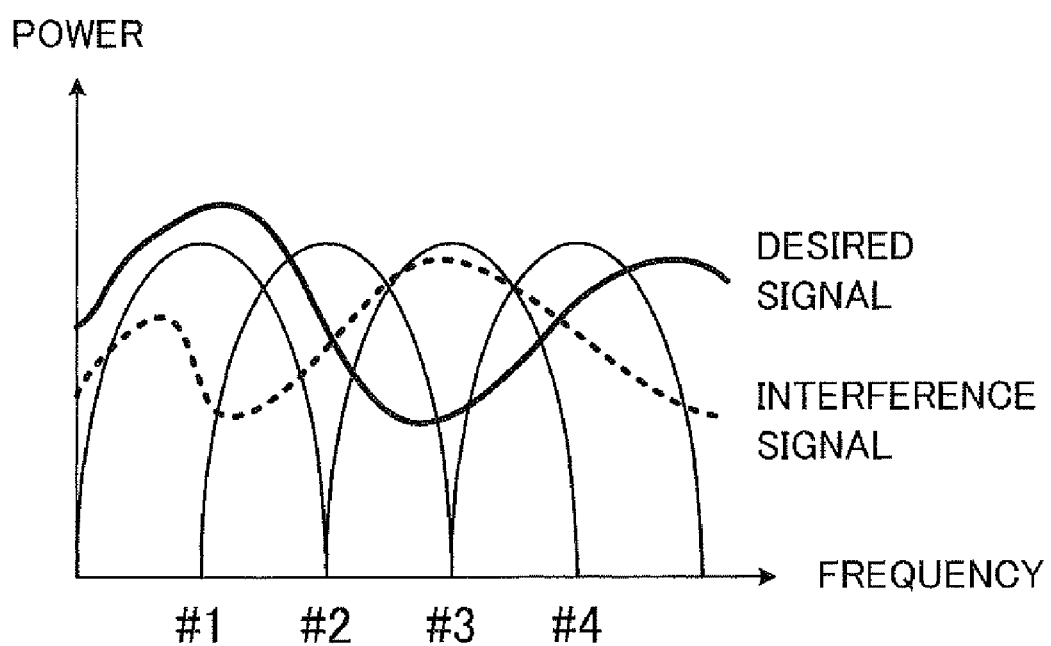
FIG. 1 is a concept diagram showing an OFDM signal.
Figure 2A:
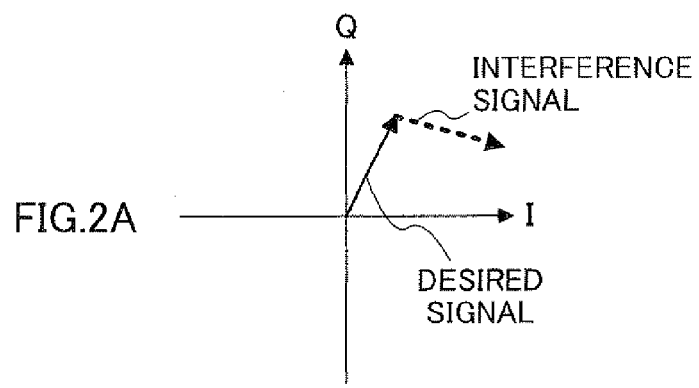
FIG. 2A is a concept diagram showing a symbol of subcarrier #1.
Figure 2B:
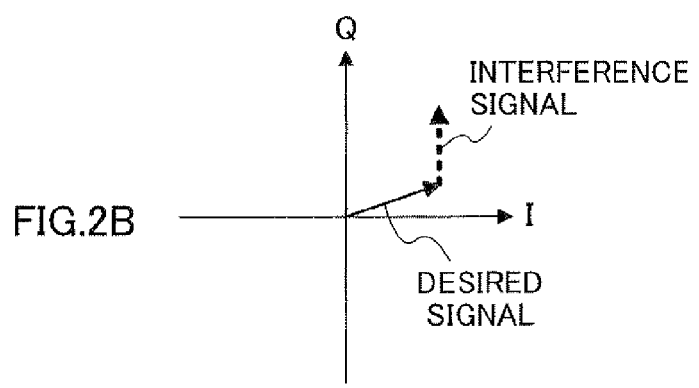
FIG. 2B is a concept diagram showing a symbol of subcarrier #2.
Figure 2C:
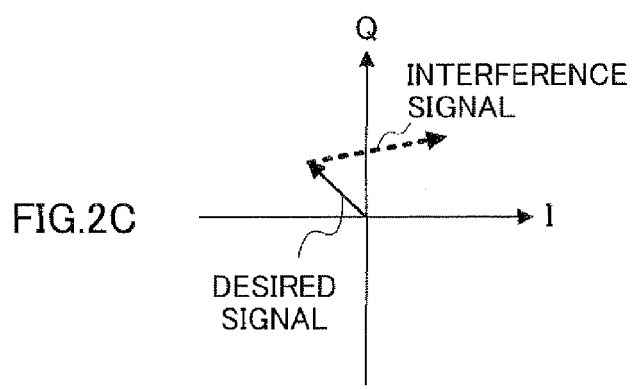
FIG. 2C is a concept diagram showing a symbol of subcarrier #3.
Figure 2D:
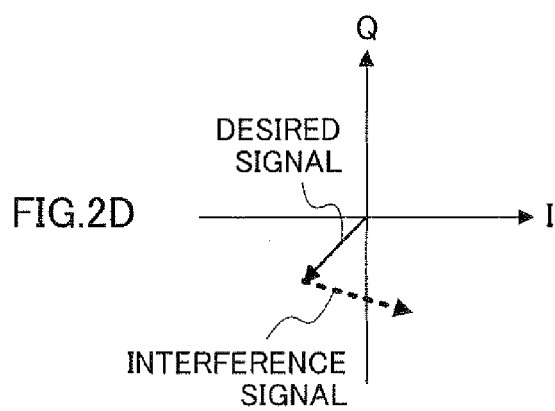
FIG. 2D is a concept diagram showing a symbol of subcarrier #4.

An OFDM symbol, which is a multicarrier signal, has an extremely low symbol rate and an OFDM symbol received in a multipath environment is received as a signal where signals of a plurality of paths are combined regardless of the number of multipaths. Accordingly, when, in the OFDM scheme, a desired signal and an interference signal are received in a mobile station through multipath, the mobile station receives, as shown in FIG. 1, both the desired signal and the interference signal as the signal where signals of a plurality of paths are combined.

Therefore, this is equivalent to that, when N interference signal sources are provided, regardless of the number of multipaths, a signal is received where one desired signal and N interference signals are combined per subcarrier #1 to #4 of an OFDM symbol. In other words, it is equivalent to that, when N interference signal sources are provided per subcarrier, regardless of the number of multipaths, a desired signal with one-path Rayleigh fading and N interference signals with one-path Rayleigh fading are provided. FIGS. 2A to 2D illustrate this state. As shown in the figures, subcarriers #1 to #4 receive a symbol that is added an interference signal to the desired signal. Accordingly, in OFDM, when there are N interference signal sources, regardless of the number of multipaths, it is possible to obtain a desired signal by canceling N interference signals from a received signal in subcarriers.

Thus, characteristics of an OFDM received signal include providing, even in a multipath environment where, in single-carrier transmission, a signal subjected to frequency selective fading is received, an OFDM received signal influenced by Rayleigh fading per subcarrier.

Meanwhile, features of the AAA technique require N+1 antennas receiving a signal where one desired signal and N interference signals are combined to cancel N interference signals. At this point, signals received at N+1 antennas include the desired signal and interference signals. Then, the signals received at the antennas are multiplied by a weight obtained by MMSE processing so that, by combining signals after weight multiplication, it is possible to cancel N interference signals from the received signal and obtain one desired signal.

In view of the above, the characteristics of the OFDM received signal and AAA technique include having subcarriers #1 to #4 shown in FIG. 1 as antennas in the AAA technique, mapping the same symbols as desired signals on four subcarriers of subcarriers #1 to #4 constituting an OFDM symbol and subjecting subcarriers #1 to #4 to MMSE processing as in the AAA technique so that, even when a number of multipaths in OFDM-scheme radio communication, occurs, a mobile station can cancel all the interference signals transmitted from three interference signal sources. Further, the mobile station does not require a plurality of antennas but requires only one antenna regardless of the number of multipaths, so that the mobile station can cancel all the interference signals transmitted from three interference signal sources. In other words, when a plurality of multipaths occur, OFDM communication requires one antenna in a mobile station and N+1 subcarriers where the same symbols are mapped as desired signals for canceling interference signals transmitted from N interference signal sources from a received signal.

Thus, the present invention cancels the interference signal included in the OFDM symbol by using the plurality of subcarriers on which the plurality of same symbols are mapped as a plurality of antennas in AAA technique and by performing MMSE processing on the plurality of same symbols in the frequency domain.

To be more specific, this can be described as follows.

In the AAA technique, a received signal $R_n$ at the antenna n is represented by equation 1, where D is a desired signal, U is an interference signal, $h_{Dn}$ is a channel estimation value of the channel of the desired signal at an antenna n, and $h_{Un}$ is a channel estimation value of the channel of the interference signal at the antenna n.

$$R_n = D \cdot h_{Dn} + U \cdot h_{Un} \quad \text{(Equation 1)}$$

Then, it is possible to cancel the interference signal U from the received signal $R_n$ and obtain the desired signal D by multiplying and combining a weight $W_n$ at the antenna n obtained by MMSE processing according to equation 2 with a signal received at the antenna n. In addition, in equation 2, P is a P vector generated from the channel estimation value $h_{Dn}$ and channel estimation value $h_{Un}$.

$$W_n = R^{-1} \cdot P \quad \text{(Equation 2)}$$

Figure 3:
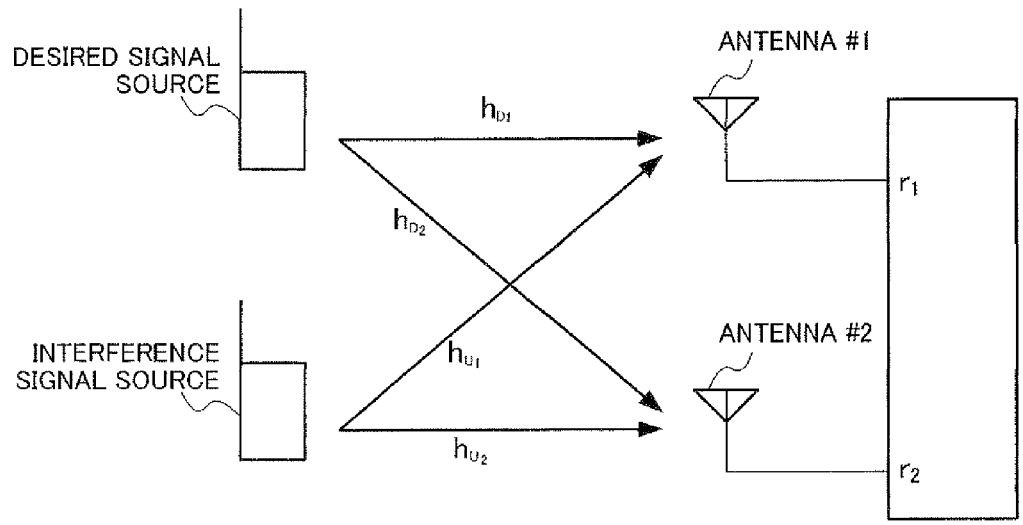
FIG. 3 is a diagram illustrating the operating principle of AAA technique.

Accordingly, for example, as shown in FIG. 3, when there is one interference signal source and the receiver side has two antennas, in the AAA technique, a received signal at antennas is obtained using equation 3.

$$\begin{pmatrix} r_1 \\ r_2 \end{pmatrix} = \begin{pmatrix} h_{d1} & h_{u1} \\ h_{d2} & h_{u2} \end{pmatrix} \begin{pmatrix} d \\ u \end{pmatrix} \quad \text{(Equation 3)}$$

Meanwhile, in the present invention, a received signal $Q_n$ in the subcarrier m is represented by equation 4, where D is a desired signal, U is an interference signal, $h_{Dm}$ is a channel estimation value of the channel in a subcarrier in of the desired signal, and $h_{Um}$ is a channel estimation value of the channel in the subcarrier in of the interference signal.

$$Q_m = D \cdot h_{Dm} + U \cdot h_{Um} \quad \text{(Equation 4)}$$

Then, it is possible to cancel the interference signal U from the received signal $Q_m$ and obtain the desired signal D by multiplying a weight $W_m$ in the subcarrier m obtained by MMSE processing according to equation 5 with a signal received in the subcarrier m. In addition, in equation 5, P is a P vector generated from the channel estimation value $h_{Dm}$ and channel estimation value $h_{Um}$.

$$W_m = Q^{-1} \cdot P \quad \text{(Equation 5)}$$

Figure 4:
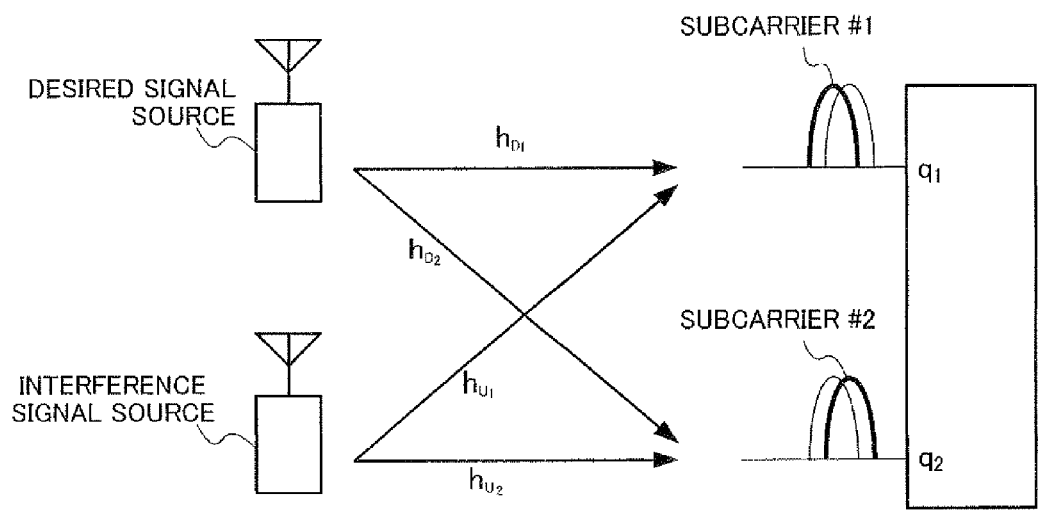
FIG. 4 is a diagram illustrating the operating principle of the present invention.

Accordingly, for example, as shown in FIG. 4, when there is one interference signal source and the receiver side receives an OFDM symbol formed with two subcarriers at one antenna, the received signal in the subcarriers is obtained by equation 6.

$$\begin{pmatrix} q_1 \\ q_2 \end{pmatrix} = \begin{pmatrix} h_{d1} & h_{u1} \\ h_{d2} & h_{u2} \end{pmatrix} \begin{pmatrix} d \\ u \end{pmatrix} \quad \text{(Equation 6)}$$

Here, upon comparison with equations 1 to 3 and equations 4 to 6, the antenna number n is replaced with the subcarrier number m and the other numbers are represented by the same equations. Thus, this is equivalent to that it is possible to cancel an interference signal from an OFDM symbol by utilizing a plurality of subcarriers of the OFDM symbol as a plurality of antennas in the AAA technique and by subjecting the plurality of subcarriers of the OFDM symbol received at one antenna to MMSE processing as in the AAA technique.

Embodiments of the present invention will be described in detail with reference to the accompanying drawings.

(Embodiment 1)

Figure 5:
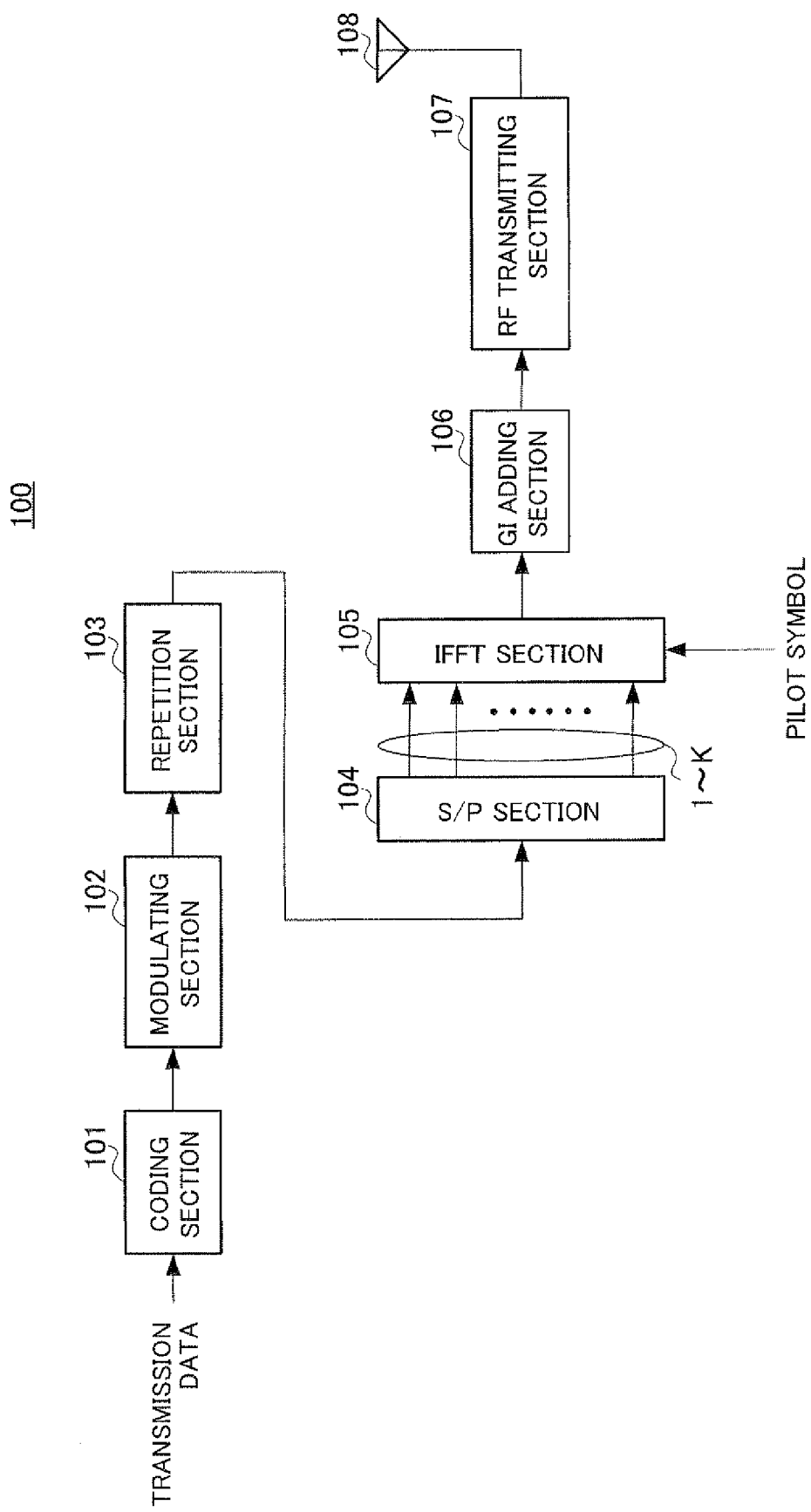
FIG. 5 is a block diagram showing a configuration of a base station according to Embodiment 1 of the present invention.
Figure 6:
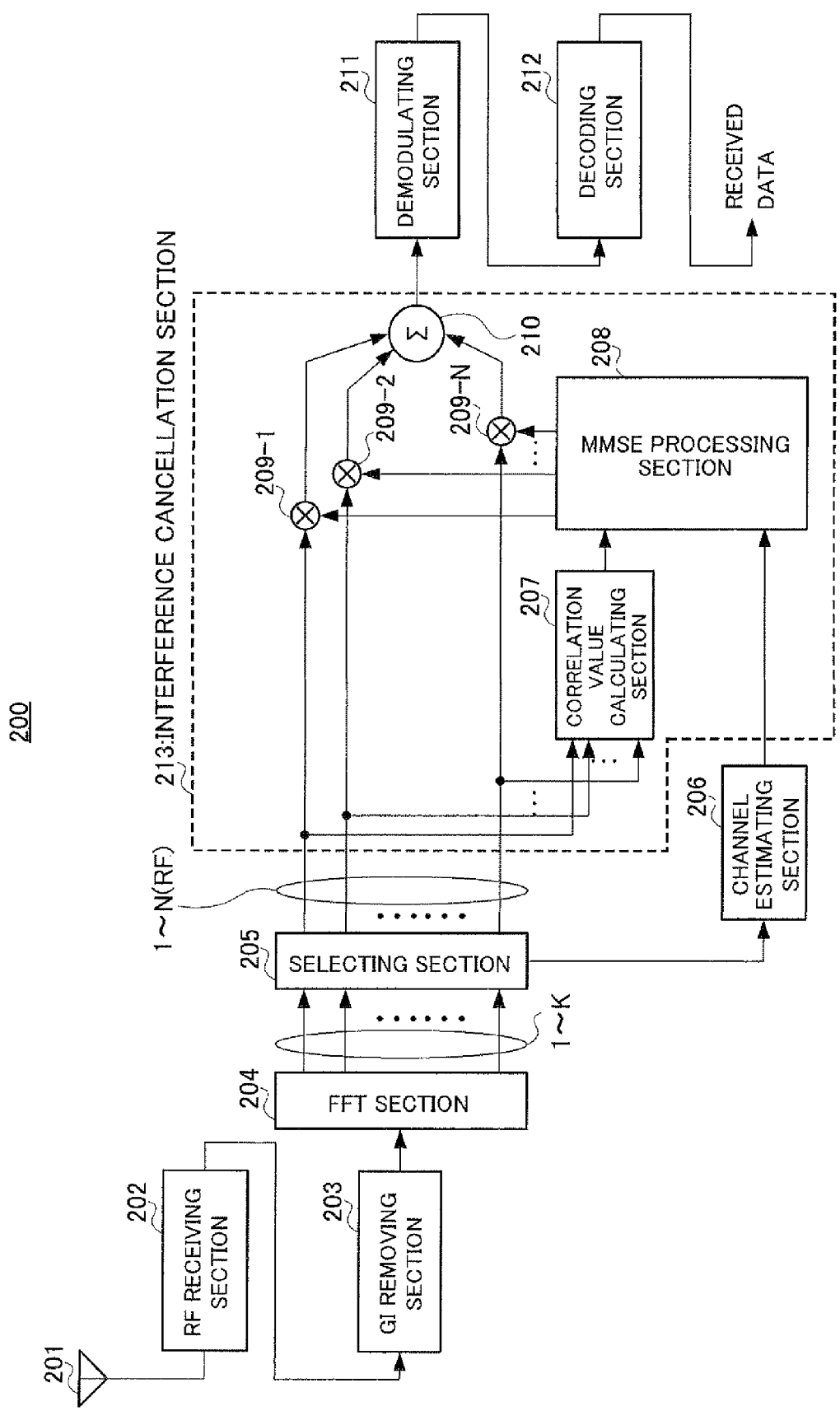
FIG. 6 is a block diagram showing a configuration of a mobile station according to Embodiment 1 of the present invention.

FIG. 5 shows a configuration of a radio communication base station apparatus (referred to as a "base station") 100 according to the present embodiment. Further, FIG. 6 shows a configuration of mobile station 200 according to the present embodiment.

In base station 100 shown in FIG. 5, coding section 101 encodes transmission data (bit sequence) and outputs encoded transmission data to modulating section 102.

Modulation section 102 modulates the encoded bit sequence, generates a symbol and outputs the symbol to repetition section 103.

Repetition section 103 repeats the input symbol (referred to as "repetition") and generates a plurality of same symbols. For example, when the repetition factor (RF) is four (RF=4), repetition section 103 obtains the four same symbols per symbol inputted from modulation section 102. In addition, here, sixteen symbols, S1 to S16, are subjected to repetition with the RF of 4 (RF=4). In other words, repetition section 103 obtains four symbols per S1 to S16.

Every time S/P section 104 receives K symbols corresponding to a plurality of subcarriers, #1 to #k constituting an OFDM symbol that is a multicarrier signal inputted in series from repetition section 103, S/P section 104 transforms the symbols into parallel symbols and outputs the transformed symbols to IFFT section 105.

IFFT section 105 subjects the symbols inputted from S/P section 104 to IFFT (Inverse Fast Fourier Transform), maps (arranges) the transformed symbols on subcarriers #1 to #k according to a predetermined mapping pattern (arrangement pattern) and generates an OFDM symbol. Further, IFFT section 105 subjects a pilot symbol (PL) to IFFT at the beginning of the frame, maps the transformed pilot symbols on subcarriers #1 to #k and generates the OFDM symbol. Here, one OFDM symbol is constituted of eight subcarriers #1 to #8.

Thus generated OFDM symbol is added a guard interval in GI adding section 106, subjected to predetermined radio processing such as upconverting in RF transmitting section 107 and subjected to radio transmission from antenna 108 to mobile station 200.

Figure 7:
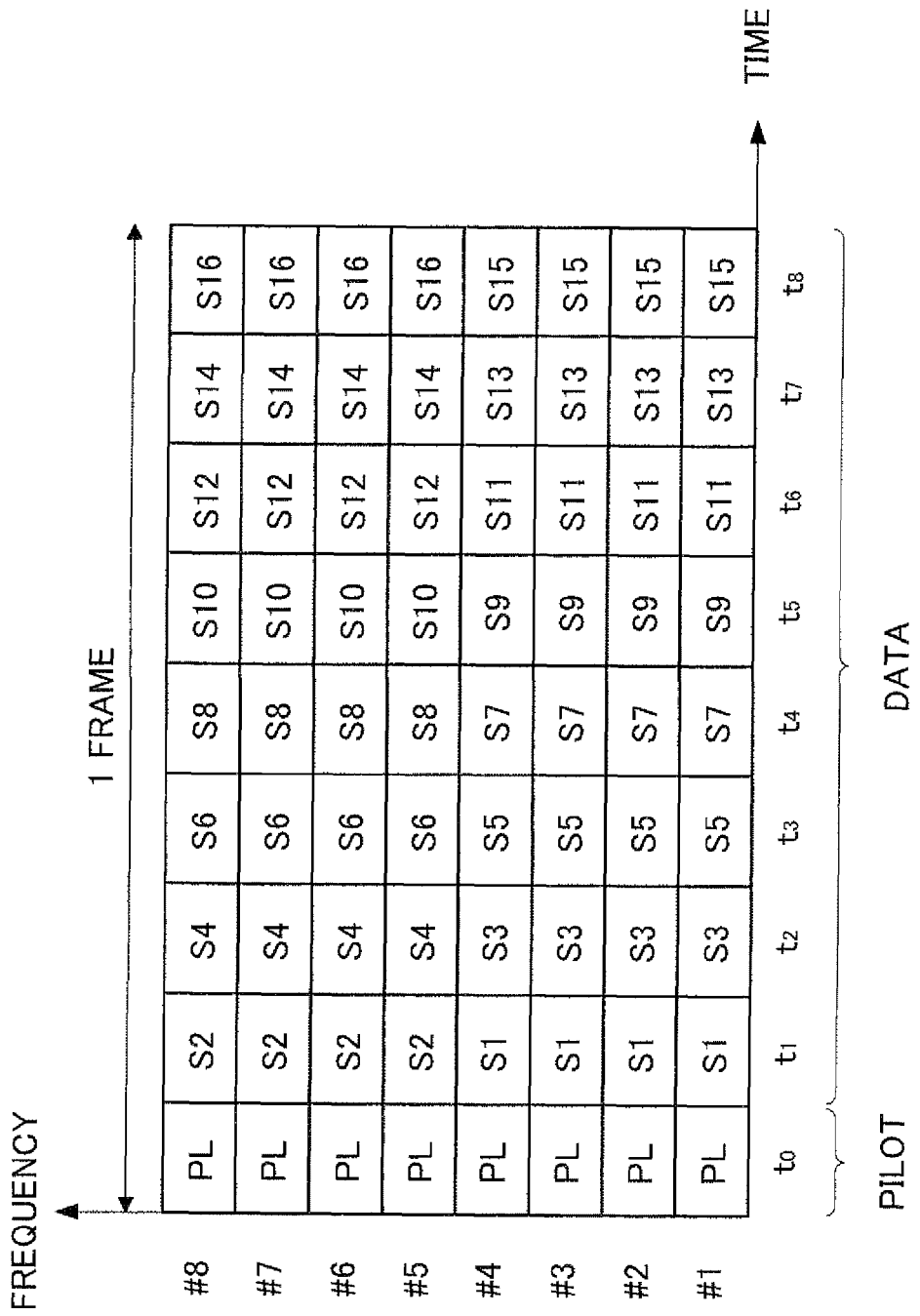
FIG. 7 is a diagram showing a mapping pattern according to Embodiment 1 of the present invention.

Here, when RF=4 and a frame is constituted of nine OFDM symbols (one OFDM symbol formed with a pilot symbol and eight OFDM symbols formed with symbols S1 to S16), a mapping pattern in the present embodiment is as shown in FIG. 7, for example. In other words, symbols S1, S3, 55, 57, S9, S11, S13 and S15 are subjected to repetition in the frequency domain with RF=4 and mapped onto subcarriers #1 to #4, and symbols S2, S4, S6, S8, S10, S12, S14 and S16 are subjected to repetition in the tune domain with RF=4 and mapped onto subcarriers #5 to #8. In other words, the same symbols are mapped onto four different subcarriers and transmitted to mobile station 200.

Mobile station 200 as shown in FIG. 6 receives an OFDM symbol transmitted from base station 100 through antenna 201. At this point, the received OFDM symbol includes the desired signal transmitted from base station 100 and interference signals transmitted from interference signal sources. These interference signals include OFDM symbols having the same frequencies as frequencies #1 to #8 of the OFDM symbols transmitted from base station 100, such as OFDM symbols transmitted from base stations other than base station 100 and OFDM symbols transmitted from mobile stations other than mobile station 200. When antenna 108 of base station 100 is a sector antenna constituted of a plurality of antennas, interference signals include OFDM symbol transmitted from antennas of sectors other than the sector where mobile station 200 is located.

The OFDM symbol including the desired signal and interference signals are subjected to predetermined radio processing such as down-conversion in RF receiving section 202, removed the guard interval in GI removing section 203 and inputted to FFT section 204.

FFT section 204 subjects the OFDM symbol inputted from GI section 203 to FFT (Fast Fourier Transform) and obtains the symbols mapped onto subcarriers #1 to #8. These symbols are inputted to selecting section 205.

In case of OFDM symbols at the beginning of the frame, selecting section 205 outputs the pilot symbols mapped onto subcarriers #1 to #8 to channel estimating section 206. Further, selecting section 205 selects the plurality of same symbols according to the mapping pattern at the time of generating OFDM symbols in base station 100 and outputs the selected symbols to correlation value calculating section 207 and multipliers 209-1 to 209-N. To be more specific, in FIG. 7, at t1, selecting section 205 first selects and outputs the four symbols S1 mapped onto subcarriers #1 to #4, and then selects and outputs the four symbols S2 mapped onto subcarriers #5 to #8. The flow is the same at t2 to t8. Accordingly, in FIG. 6, the equation of N=RF=4 holds. Further, these four symbols are added interference signals. In other words, selecting section 205 selects and outputs sequentially the same symbols that are added interference signals.

Channel estimating section 206 obtains channel estimation values of subcarriers #1 to #8 using the input pilot symbols. Then, channel estimating section 206 generates and outputs a P vector using the channel estimation values to MMSE processing section 208. For example, at t1 selecting section 205 selects four symbols S1 mapped onto subcarriers #1 to #4 and channel estimating section 206 generates a P vector shown in equation 7 using channel estimation values $h_1$ to $h_4$ of subcarriers #1 to #4. The flow is the same for symbols S2 to S16. In addition, the channel estimation value is calculated based on the pilot symbol at the beginning of the frame and the same channel estimation values are used over a one frame per subcarrier.

$$P = \begin{pmatrix} h_1 \\ h_2 \\ h_3 \\ h_4 \end{pmatrix} \quad \text{(Equation 7)}$$

Correlation value calculating section 207 obtains cross-correlation values between subcarriers of the same symbol. For example, when the four symbols S1 mapped onto subcarriers #1 to #4 are inputted, correlation value calculating section 207 obtains cross-correlation values of these four symbols among subcarriers #1 to #4. Then, correlation value calculating section 207 generates an R matrix from the cross-correlation values, obtains the inverse matrix of the R matrix and outputs the obtained inverse matrix to MMSE processing section 208. For example, at t1 when selecting section 205 selects the four symbols S1 mapped onto subcarriers #1 to #4, correlation value calculating section 207 generates an R matrix represented by equation 8 using cross-correlation values $X_{11}$ to $X_{44}$ among subcarriers #1 to #4. The flow is the same for symbols S2 to S16.

$$R = \begin{pmatrix} x_{11} & x_{21} & x_{31} & x_{41} \\ x_{12} & x_{22} & x_{32} & x_{42} \\ x_{13} & x_{23} & x_{33} & x_{43} \\ x_{14} & x_{24} & x_{34} & x_{44} \end{pmatrix} \quad \text{(Equation 8)}$$

MMSE processing section 208 subjects the P vector (P) inputted from channel estimating section 206 and inverse matrix ($R^{-1}$) of the R matrix inputted from correlation value calculating section 207 to MMSE processing using matrix operation represented by equation 9, obtains weights W ($W_1$ to $W_4$) and outputs the weights to multipliers 209-1 to 209-N. The flow is the same for symbols S2 to S16.

$$W = R^{-1} \cdot P \quad \text{(Equation 9)}$$

In addition, such a weight generating method is known widely as the SMI (Sample Matrix Inverse) method in the AAA technique.

Multipliers 209-1 to 209-N multiply the symbols selected in selecting section 205 with the weights obtained in MMSE processing section 208.

Combining section 210 combines symbols after weight multiplication and generates a combined signal. The same symbols combined in combining section 210 are the symbols mapped onto a plurality of different subcarriers so that it is possible to cancel the interference signals from symbols S1 to S16 by combining the symbols among the subcarriers. In the invention, subcarriers of an OFDM symbol corresponds to antennas in the AAA technique so that, regardless of the number of multipaths, it is possible to cancel all the interference signals from RF−1 (three) interference signal sources from symbols S1 to S16 with RF=4.

In addition, interference cancellation section 213 has correlation value calculating section 207, MMSE processing section 208, multipliers 209-1 to 209-N and combining section 210.

Thus generated combined signal is demodulated in demodulation section 211 and decoded in decoding section 212. The received data is thereby obtained.

Thus, in the present embodiment, regardless of the number of multipaths, it is possible to cancel all the interference signals from RF−1 interference signal sources by utilizing a plurality of subcarriers of an OFDM symbol as a plurality of antennas in the AAA technique and by subjecting the plurality of subcarriers of the OFDM symbol to same MMSE processing as in the AAA technique. Accordingly, the mobile station does not require a large number of antennas as the conventional AAA technique but requires only one antenna for canceling interference signals, so that, regardless of the number of multipaths, it is possible to avoid making the apparatus larger for canceling interference signals. Further, although the AAA technique increases the number of receiving antennas based on increase in the number of interference signal sources and the number of multipaths, even when interference signal sources increase, regardless of an increase of multipaths, it is possible to efficiently cancel interference signals by only increasing RF.

Further, the present embodiment is effective particularly in a mobile communication system where a communication area (cell) that one base station covers is divided into a plurality of sectors in the angular directions by sector antennas having directivity. Signals transmitted to the plurality of divided sectors are transmitted from a plurality of antennas of one base station and an interference signal level is likely to be higher in interferences between sectors than interferences between cells regardless of a place where the mobile station is positioned. The effect of improving SIR (Signal to Interference Ratio) is small for interference between sectors than for inter-cell interference when the desired signal level is increased so that it is possible to enhance the effect of improving SIR by suppressing the interference signal level as in the present embodiment.

(Embodiment 2)

Figure 8:
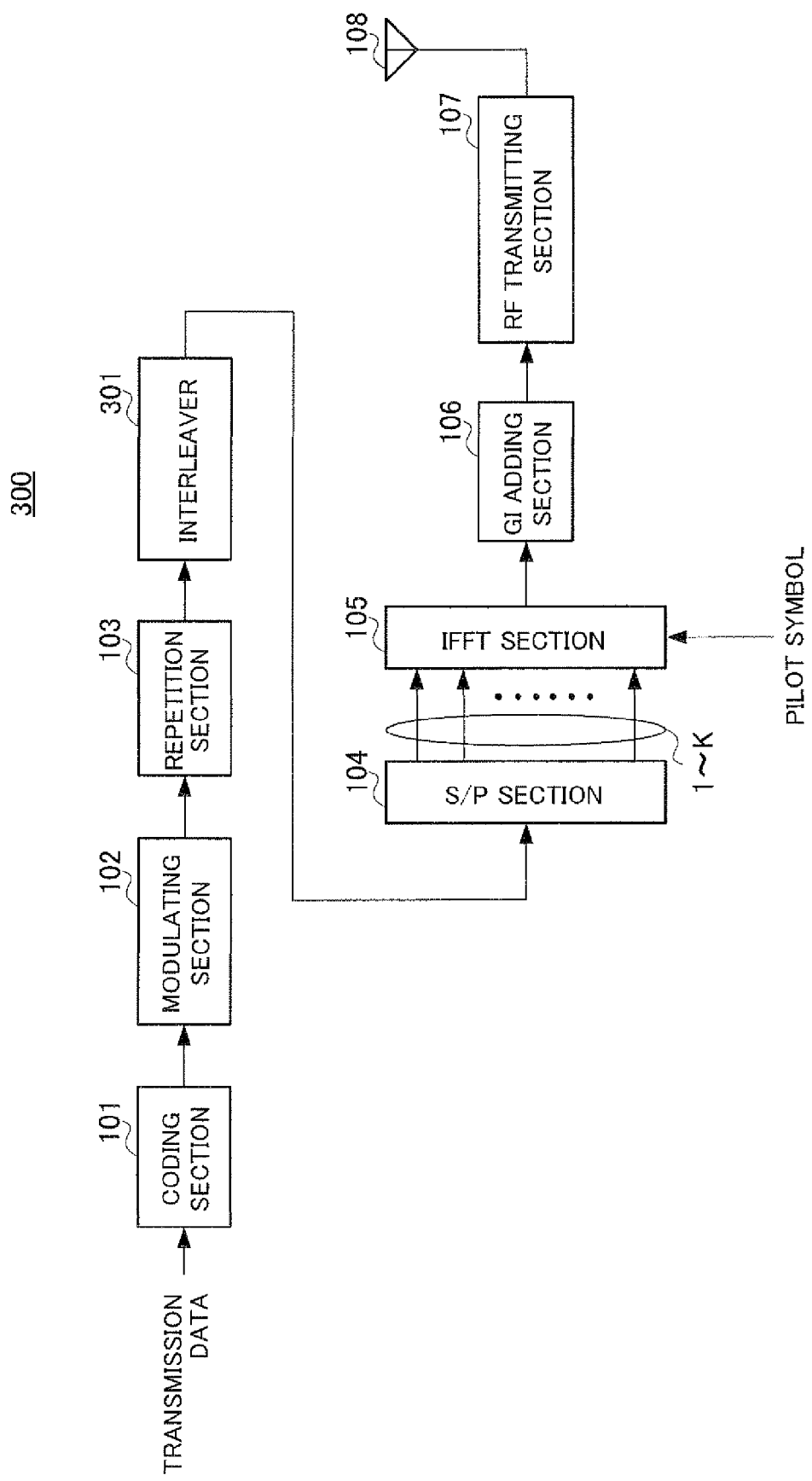
FIG. 8 is a block diagram showing a configuration of a base station according to Embodiment 2 of the present invention.

FIG. 8 shows a configuration of base station 300 according to the present embodiment. Base station 300 further has interleaver 301 in the configuration of base station 100 (FIG. 5) according to Embodiment 1.

Here, when symbols are subjected to repetition as in Embodiment 1, the plurality of same symbols subjected to repetition may be interleaved the frequency domain so that it is possible to improve the diversity effect in the frequency domain. Further, the plurality of same symbols subjected to repetition may be interleaved in the time domain so that it is possible to enhance the diversity effect in the time domain.

However, the mapping pattern of desired signals subjected to repetition onto subcarriers and a mapping pattern of interference signals subjected to repetition onto subcarriers needs to be the same in the frequency domain so that it is possible to obtain a desired signal by canceling interference signals from a received signal in mobile station 200 according to Embodiment 1. In fact, the desired signal and interference signal need to be arranged in the frequency domain in the same pattern, so that it is possible to obtain a desired signal by canceling interference signals from a received signal in mobile station 200 according to Embodiment 1. In other words, when the same symbols of the desired signals are mapped onto subcarriers #1 to #4, the same symbols of the interference signals need to be mapped onto subcarriers #1 to #4. Accordingly, interleaver 301 of the desired signal source and interleaver 301 of the interference signal source need to interleave the same symbols subjected to repetition in the frequency domain according to the same interleaving pattern.

Figure 9:
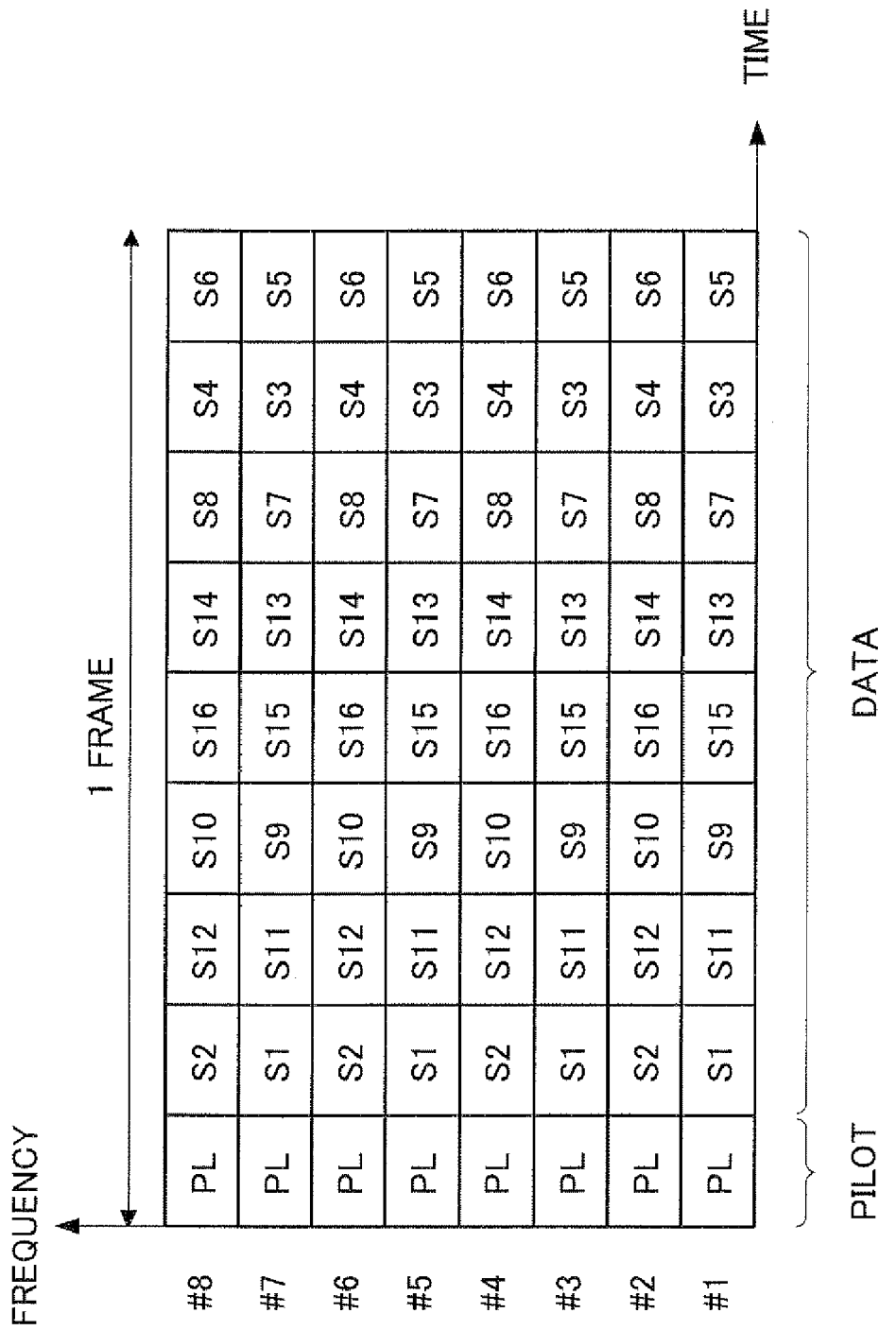
FIG. 9 is a diagram showing a mapping pattern according to Embodiment 2 of the present invention.

Then, interleaver 301 interleaves, as shown in FIG. 9, symbols shown in FIG. 7. Then, at this point, the desired signal and interference signal are interleaved in the same pattern in the frequency domain. In contrast, when interleaving is performed in the time domain, interleaver 301 does not interleave symbols, but interleaves OFDM symbols (per column). In this way, the mapping pattern of desired signals subjected to repetition onto subcarriers and the mapping pattern of interference signals subjected to repetition onto subcarriers in the frequency domain become the same, so that it is possible to reliably cancel the interference signals from the received signal.

Here, the desired signal and the interference signals may be interleaved in the time domain using different interleaving patterns.

Figure 10:
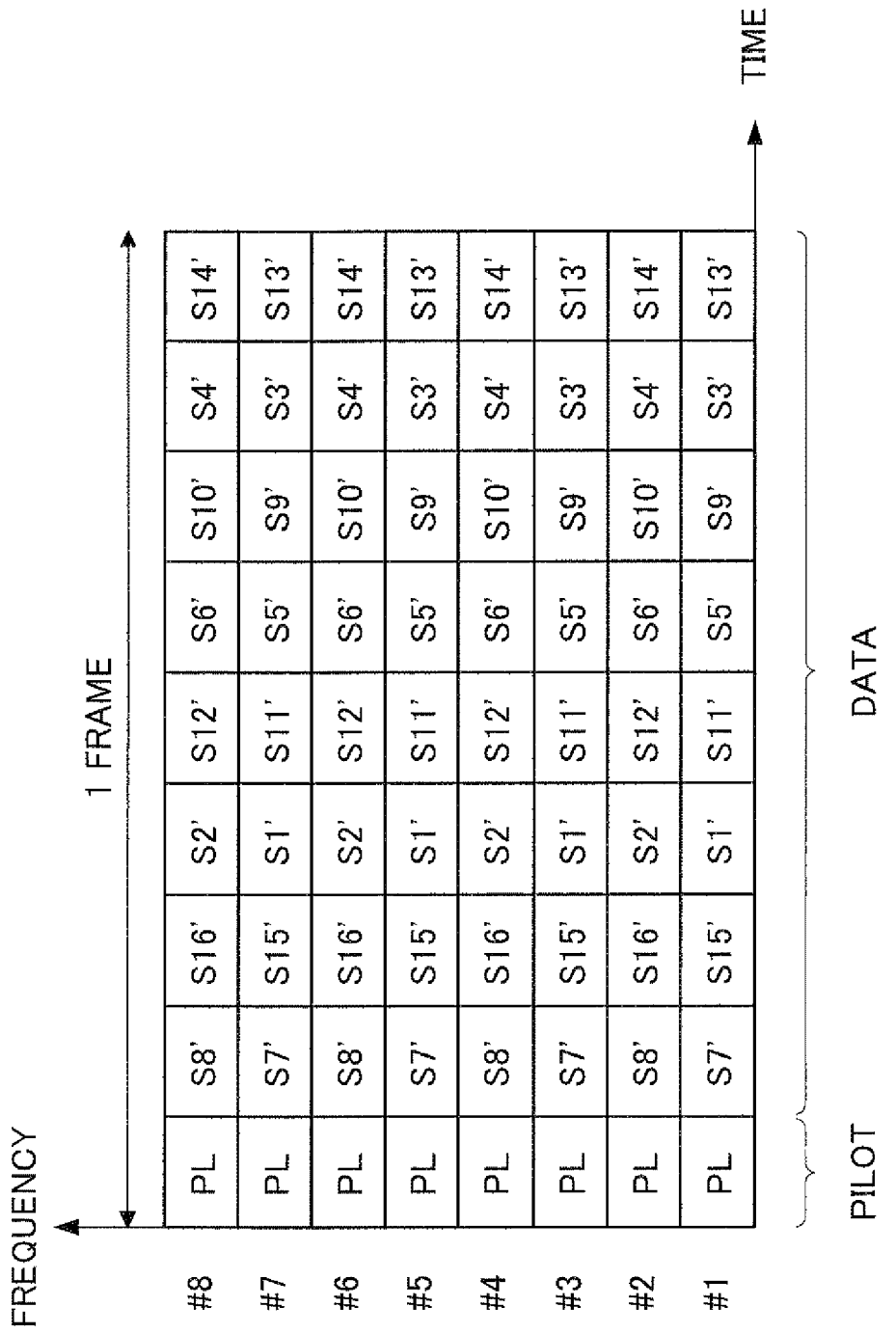
FIG. 10 is a diagram showing a mapping pattern according to Embodiment 2 of the present invention.

For example, the mapping pattern of the desired signal source is shown in FIG. 9 and the mapping pattern of the interference signal source is shown in FIG. 10. As shown in these figures, when the symbol S1 that is the desired signal is mapped onto subcarriers #1, #3, #5 and #7, the symbol S7' that is the interference signal is also mapped onto subcarriers #1, #3, #5 and #7. Thus, all the combinations of the desired signal and the interference signal in subcarriers #1, #3, #5 and #7 become the same, so that it is possible to prevent a decrease in interference cancellation performance due to a difference in the interleaving pattern in the frequency domain between the desired signal and the interference signal.

In addition, as in Embodiment 1, the present embodiment is effective particularly in a mobile communication system where a communication area (cell) that one base station covers is divided into a plurality of sectors in the angular directions by sector antennas having directivity. When a base station has a plurality of sectors, signals are transmitted to adjacent sectors from the one base station, the base station makes it easy to make the interleaving patterns of the interference signal and the desired signal the same in mobile station 200. In other words, signaling is required between base stations in different cells for matching interleaving patterns between the adjacent cells and processing is required in one base station for matching interleaving patterns between adjacent sectors.

In addition, in the present embodiment, it is possible to make the interleaving patterns of the desired signal and interference signal different when performing interleaving in the time domain as described above, so that it is possible to make interleaving intervals different in the time domain of symbols for mobile stations. For example, by making the interleaving interval shorter in the time domain for a mobile station with a high moving speed, making delay for interleaving shorter and making the interleaving interval longer in the time domain for a mobile station with a low moving speed, it is possible to enhance reception performance.

(Embodiment 3)

Mobile station 200 according to Embodiment 1 increases the processing amount of matrix operation in MMSE processing, as the RF (Repetition Factor) increases. Therefore, in the present embodiment, MMSE processing is divided and performed.

Figure 11:
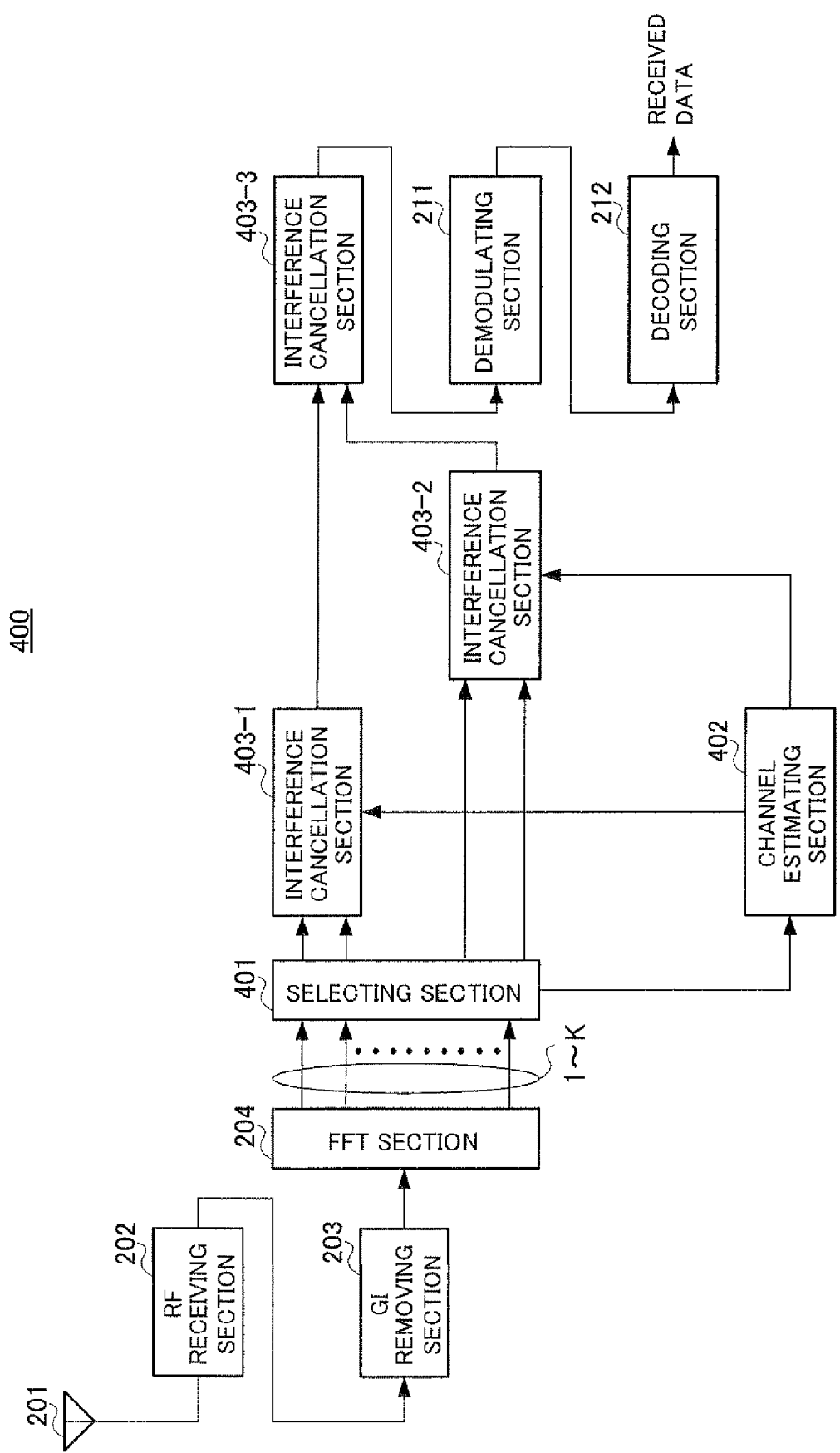
FIG. 11 is a block diagram showing a configuration of a mobile station according to Embodiment 3 of the present invention.

FIG. 11 shows a configuration of mobile station 400 according to the present embodiment. In addition, in FIG. 11, the same components as mobile station 200 (FIG. 6) according to Embodiment 1 are assigned the same reference numerals and are not described. Further, in FIG. 11, the internal configuration of interference cancellation sections 403-1 to 403-3 is the same as the internal configuration of interference cancellation section 213 in FIG. 6.

In case of OFDM symbols at the beginning of the frame in FIG. 7, selecting section 401 outputs the pilot symbols mapped onto subcarriers #1 to #8 to channel estimating section 402. Further, selecting section 401 selects the plurality of same symbols according to the mapping pattern at the time of generating OFDM symbols in base station 100 and outputs the symbols to interference cancellation sections 403-1 and 403-2.

For example, to focus on symbol S1 in FIG. 7, selecting section 401 outputs two symbols S1 mapped onto subcarriers #1 and #3 to interference cancellation section 403-1 and outputs two symbols S1 mapped onto subcarriers #2 and #4 to interference cancellation section 403-2.

Here, subcarriers #1 and #3 are combined and subcarriers #2 and #4 are combined because, by combining subcarriers having small correlation, it is possible to reliably generate the inverse matrix of the R matrix in interference cancellation sections 403-1 and 403-2.

Channel estimating section 402 outputs a P vector generated using channel estimation values of subcarriers #1 and #3 to interference cancellation section 403-1 and outputs a P vector generated from channel estimation values of subcarriers #2 and #4 to interference cancellation section 403-2.

Accordingly, interference cancellation sections 403-1 and 403-2 subject the inverse matrix of the R matrix with two rows and two columns and the P vector with two rows and one column to MMSE processing and output a combined signal to interference cancellation section 403-3. In other words, as the first step of MMSE processing, interference cancellation sections 403-1 and 403-2 subject approximately RF/2 to MMSE processing.

Further, interference cancellation section 403-1 multiplies channel estimation values of subcarriers #1 and #3 with weights $W_1$ and $W_3$ obtained by MMSE processing, adds and outputs the results (combined channel estimation value) to interference cancellation section 403-3, and interference cancellation section 403-2 multiplies channel estimation values of subcarriers #2 and #4 with weights $W_2$ and $W_4$ obtained by MMSE processing, adds and outputs the results (combined channel estimation value) to interference cancellation section 403-3.

Then, as the second step of MMSE processing, interference cancellation section 403-3 subjects remaining RF/2 to MMSE processing. In other words, interference cancellation section 403-3 performs MMSE processing using the inverse matrix of the R matrix with two rows and two columns generated from two combined signals and the P vector with two rows and one column generated from two combined channel estimation values, and outputs a combined signal to demodulation section 211. Interference cancellation section 403-3 outputs the combined signal as a signal from which interference signal is canceled, as the combined signal outputted from interference cancellation section 213 in FIG. 6.

Thus, the present embodiment performs MMSE processing described in Embodiment 1 in two steps so that it is possible to reduce the processing amount of matrix operation in MMSE processing. Particularly, the present embodiment provide the R matrix with two rows and two columns and the P vector with two rows and one column so that it is possible to achieve the effect of reducing the operation amount significantly.

In addition, by increasing the number of divisions of MMSE processing based on the increase in the RF (repetition factor), when the RF is large, it is possible to reduce the operation amount of MMSE processing as in the present embodiment.

(Embodiment 4)

Although cases have been described with the above embodiments where the repetition factor for the desired signal and the repetition factor for the interference signal is the same, even when the repetition factor for the desired signal and the repetition factor for interference signals are different, it is possible to cancel interference signals from the desired signal as described below.

Figure 12:
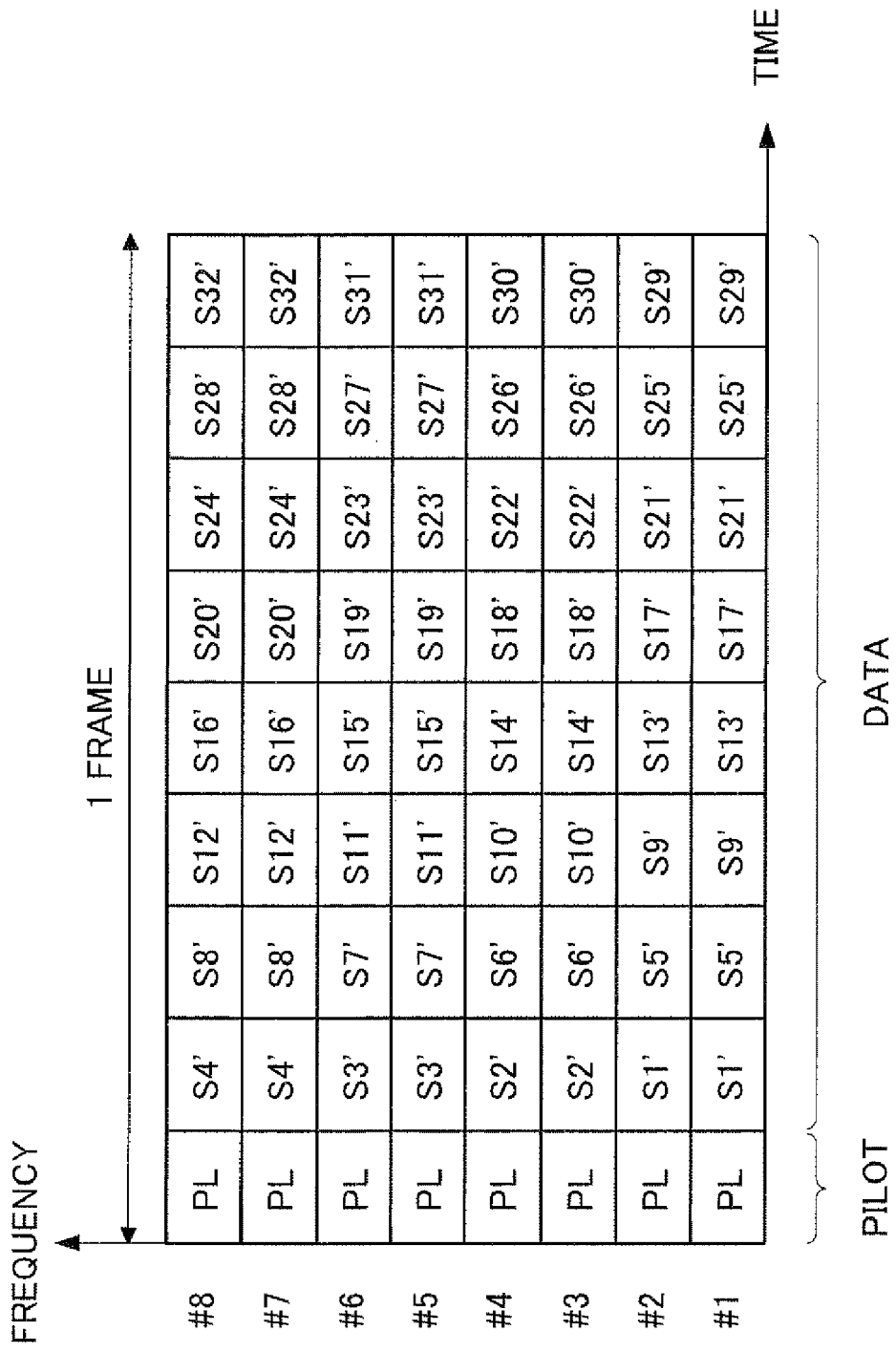
FIG. 12 is a diagram showing a mapping pattern according to Embodiment 4 of the present invention.

For example, when the repetition factor for the desired signal is four (RF=4) as shown in FIG. 7 and the repetition factor for the interference signal is two (RF=2) as shown in FIG. 12, it is possible at mobile station 400 having a configuration shown in FIG. 11 to cancel the interference signal as described below.

In other words, in case of OFDM symbols at the beginning of the frame in FIG. 7, selecting section 401 outputs the pilot symbols mapped onto subcarriers #1 to #8 to channel estimating section 402. Further, when the repetition factor (RF=4) for the desired signal is more than the repetition factor (RF=2) for the interference signal, selecting section 401 selects and outputs the plurality of same symbols in accordance with the repetition factor (RF=2) for the interference signal to interference cancellation sections 403-1 and 403-2.

For example, to focused on symbols S1 in FIG. 7, selecting section 401 outputs subcarriers where symbol S1' in FIG. 12 is provided as the interference signal (that is, two symbols S1 mapped onto subcarriers #1 and #2) to interference cancellation section 403-1, and outputs subcarriers where symbol S2' in FIG. 12 is provided as the interference signal (that is, two symbols S1 mapped onto subcarriers #3 and #4) to interference cancellation section 403-2.

Channel estimating section 402 outputs a P vector generated using channel estimation values of subcarriers #1 and #2 to interference cancellation section 403-1, and outputs a P vector generated using channel estimation values of subcarriers #3 and #4 to interference cancellation section 403-2.

Accordingly, interference cancellation sections 403-1 and 403-2 subject the inverse matrix of the R matrix with two rows and two columns and the P vector with two rows and 1 column to MMSE processing, and outputs a combined signal to interference cancellation section 403-3.

Further, interference cancellation section 403-1 multiplies channel estimation values of subcarriers #1 and #2 with weights $W_1$ and $W_2$ obtained by MMSE processing, and adds the multiplied channel estimation values and outputs the addition result (combined channel estimation value) to interference cancellation section 403-3, and interference cancellation section 403-2 multiplies channel estimation values of subcarriers #3 and #4 with weights $W_3$ and $W_4$ obtained by MMSE processing, and adds the multiplied channel estimation values and outputs the addition result (combined channel estimation value) to interference cancellation section 403-3.

Then, interference cancellation section 403-3 subjects the inverse matrix of the R matrix with two rows and two columns generated from two combined signals and the P vector with two rows and one column generated from two combined channel estimation values to MMSE processing, and outputs a combined signal to demodulation section 211.

When the repetition factor for the desired signal is more than the repetition factor for the interference signal, the interference signal can thus be canceled from the desired signal.

Further, when a plurality of repetition factors (RF) for the interference signal are provided (even when, for example, as shows in FIG. 13, subcarriers #1 to #4 hold RF=2 and subcarriers #5 to #8 hold RF=4), it is possible to cancel the interference signal from the received signal in the same way as described above. In this case, by making repetition factors different per plurality of mobile station at a base station of the interference signal source, it is possible to subjects mobile stations holding RF=2 and mobile station holding RF=4 to frequency multiplexing on subcarriers #1 to #8. In addition, when the mapping pattern shown in FIG. 12 is used, at a base station of the interference signal source, it is possible to subject a plurality of four mobile stations at maximum holding RF=2 to frequency multiplexing on subcarriers #1 to #8.

Figure 14:
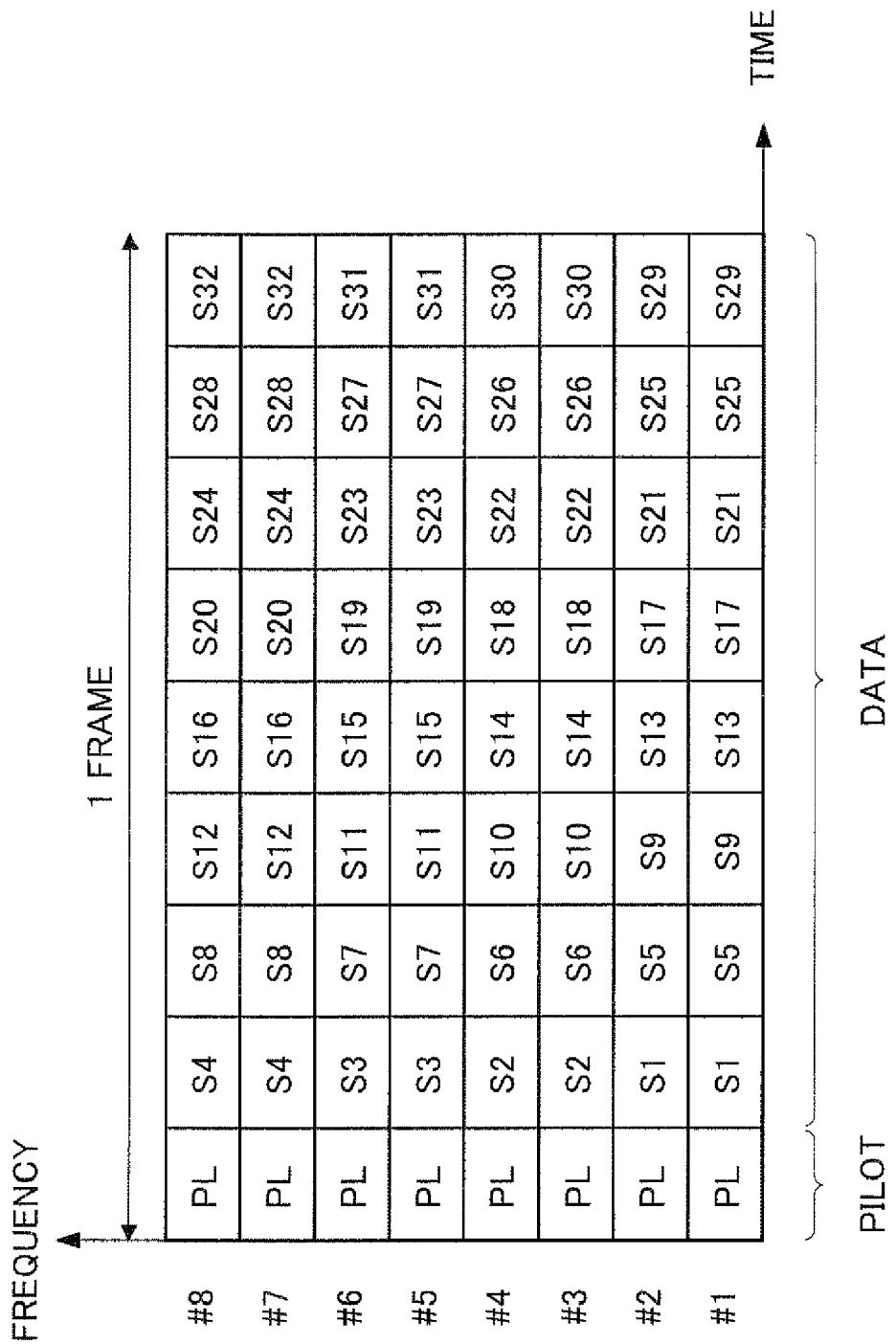
FIG. 14 is a diagram showing a mapping pattern according to Embodiment 4 of the present invention.
Figure 15:
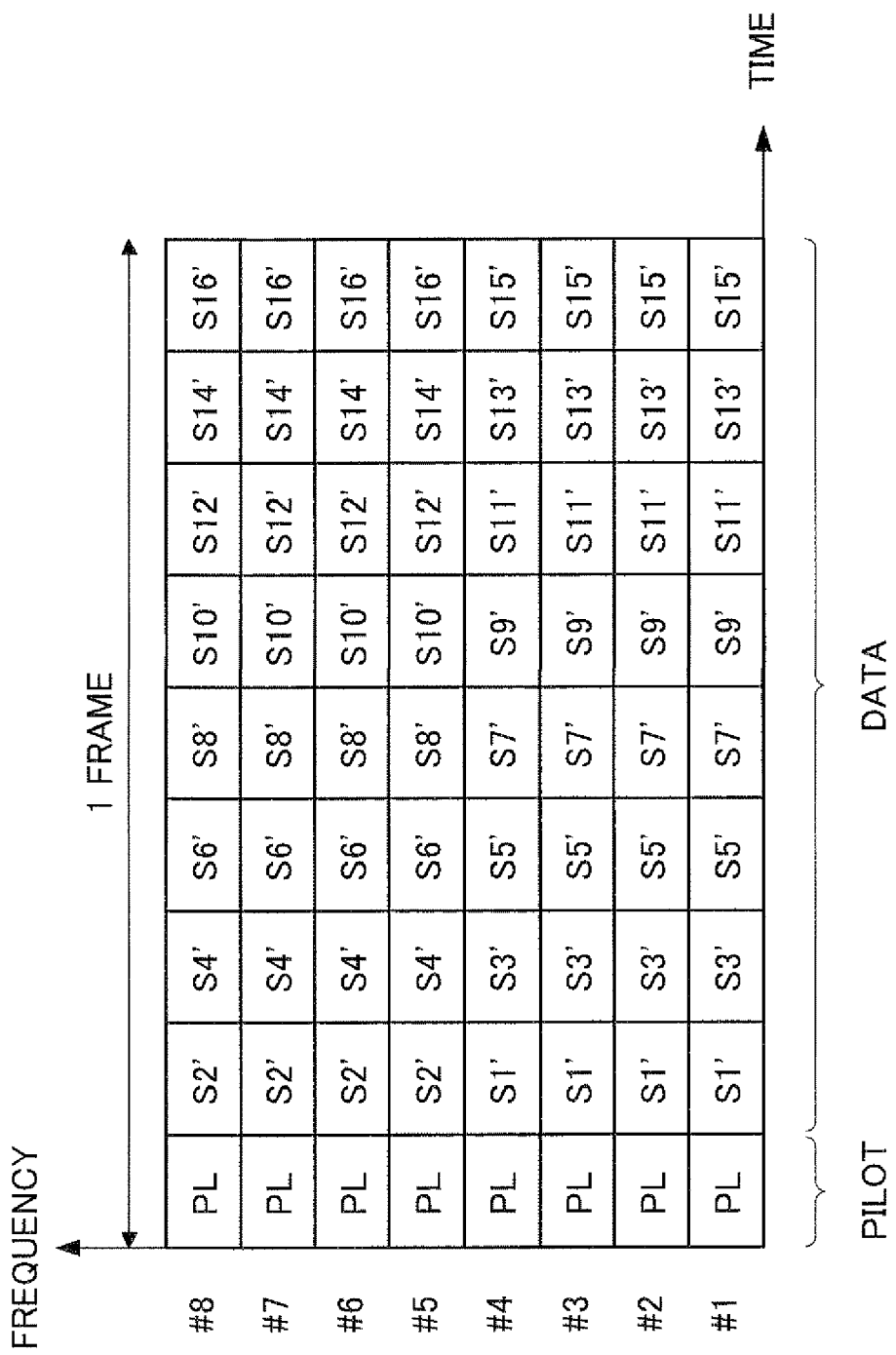
FIG. 15 is a diagram showing a mapping pattern according to Embodiment 4 of the present invention.

Meanwhile, when the repetition factor for the desired signal is less than the repetition factor for the interference signal (for example, when the repetition factor for the desired signal is two (RF=2) as shown in FIG. 14 and the repetition factor for the interference signal is four (RF=4) as shown in FIG. 15), it is possible at mobile station 200 having the configuration shown in FIG. 6 to cancel the interference signal as described below.

That is, mobile station 200 adopting the configuration as shown in FIG. 6 provides N=RF=2 according to the repetition factor (RF=2) of the desired signal, and selecting section 205 selects and outputs every two symbols mapped onto subcarriers #1 to #8 sequentially so that it is possible to cancel the interference signal from the received signal as in Embodiment 1.

Further, the repetition factor and mapping pattern for the base station of the desired signal source and the base station of the interference signal source are determined so that it is possible at the mobile station to cancel the interference signal as described above.

Figure 13:
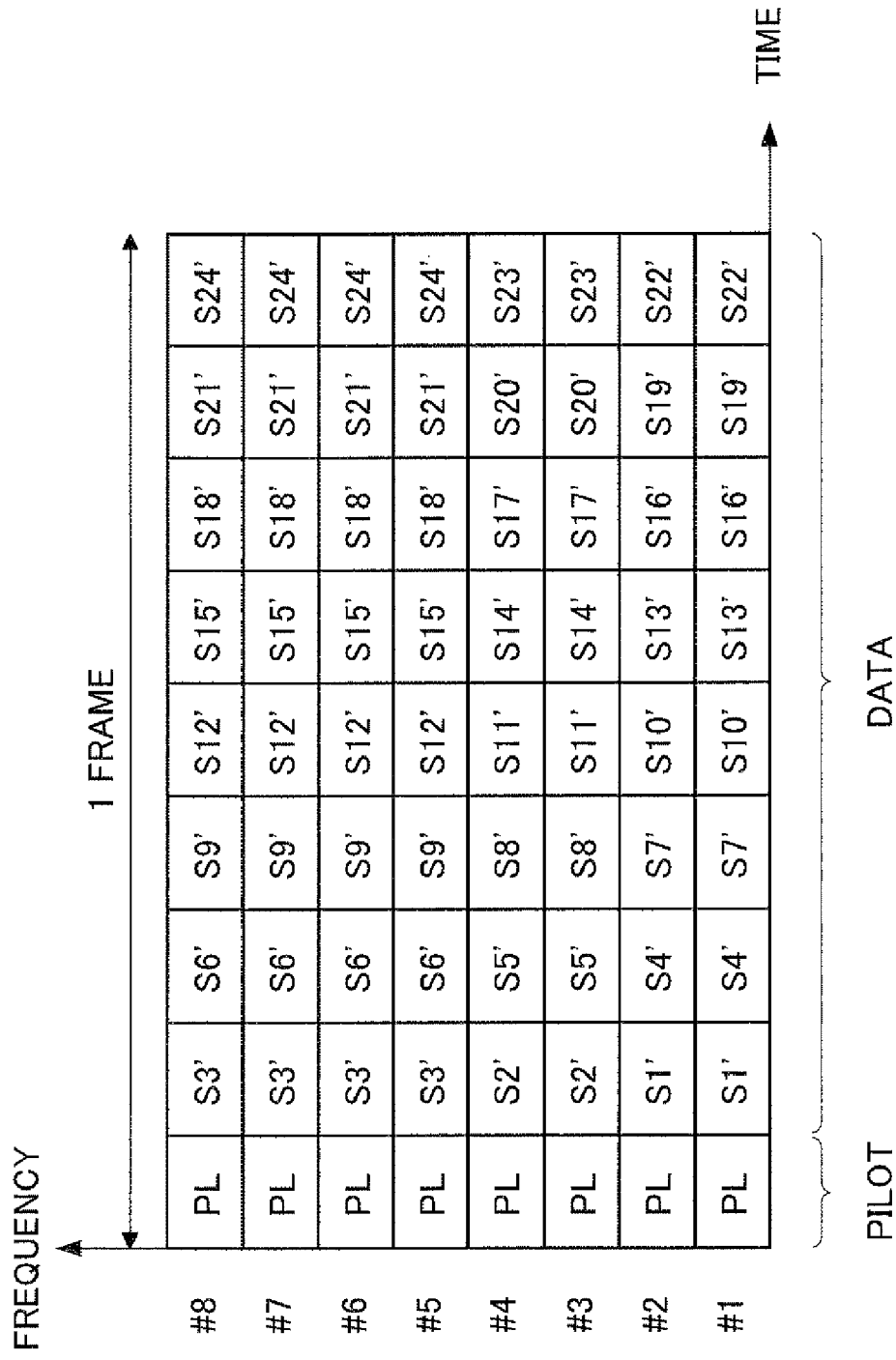
FIG. 13 is a diagram showing a mapping pattern according to Embodiment 4 of the present invention.
Figure 16:
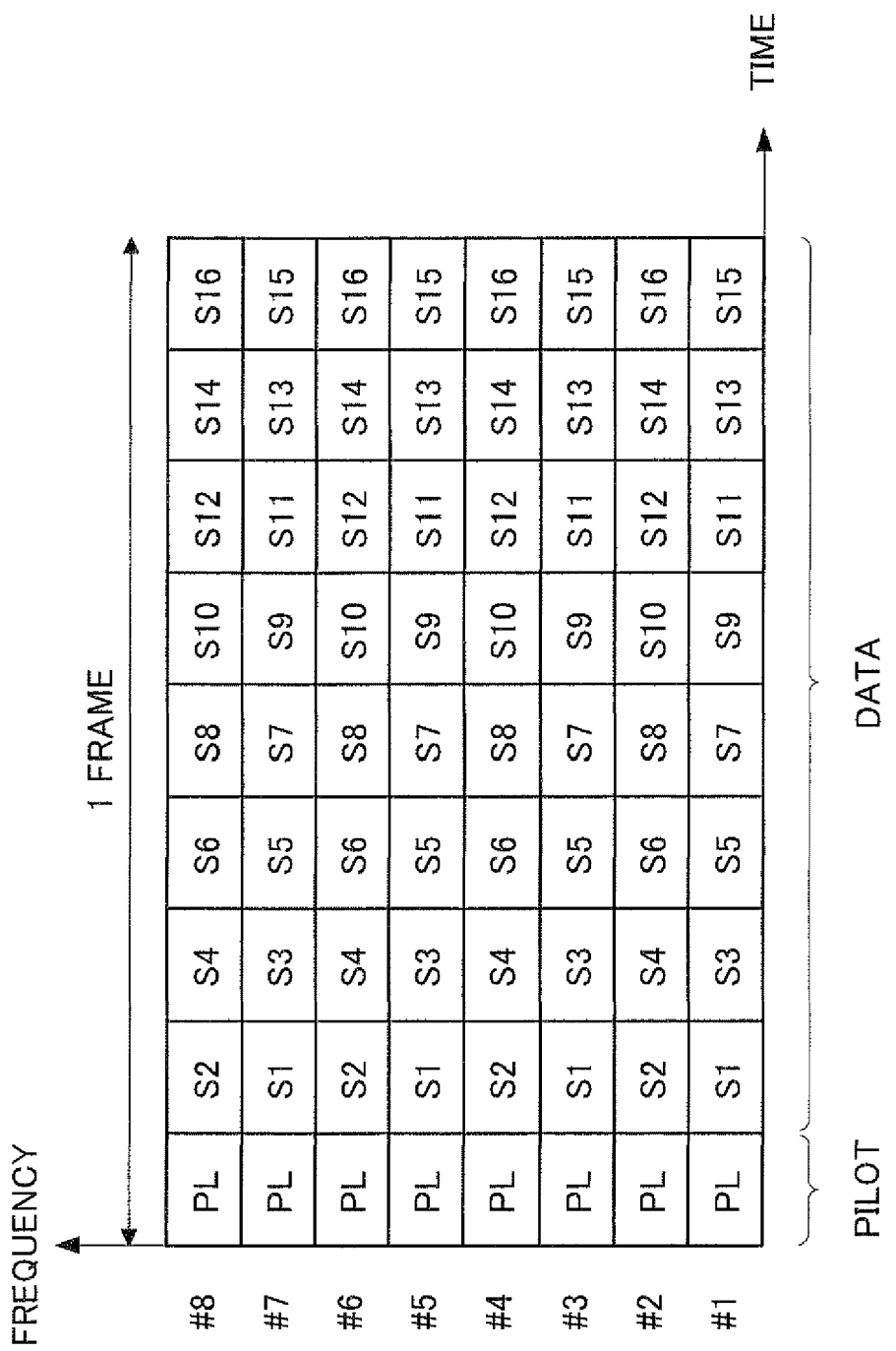
FIG. 16 is a diagram showing a mapping pattern according to Embodiment 4 of the present invention.
Figure 17:
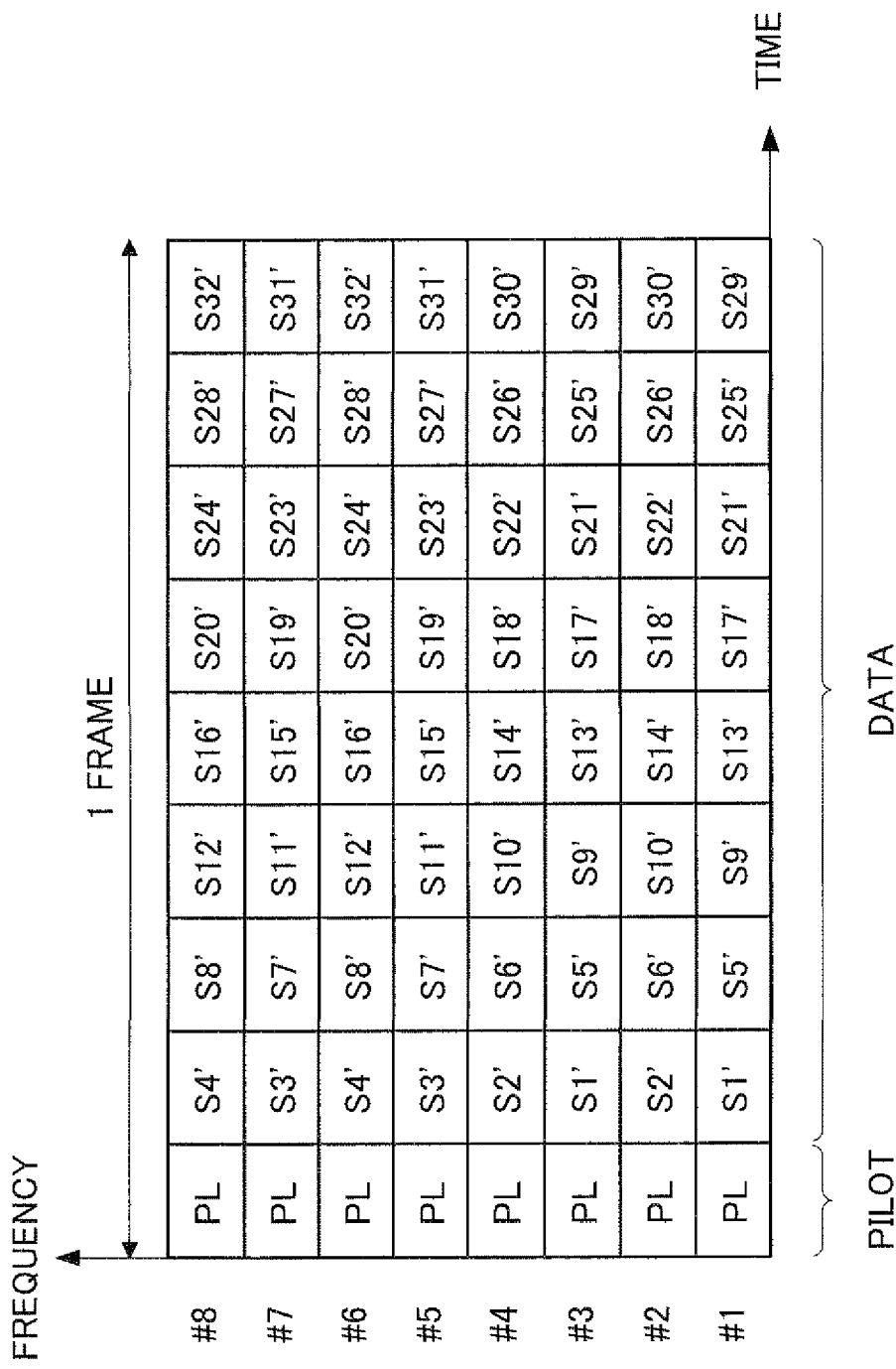
FIG. 17 is a diagram showing a mapping pattern according to Embodiment 4 of the present invention.

For example, when the repetition factor for the desired signal is four (RF=4) as shown in FIG. 7 and the repetition factor for the interference signal is two (RF=2) as shown in FIG. 12, based on the repetition factor for the interference signal (RF=2), the mapping pattern of the desired signal and the mapping pattern of the interference signal are made the same in at least two symbols. Further, as shown in FIGS. 16 and 17, when the mapping patterns in FIGS. 7 and 13 are interleaved in the frequency domain, the same mapping pattern of the desired signal and the mapping pattern of the interference signal are made the same in at least two symbols include.

Meanwhile, when the repetition factor for the desired signal is two (RF=2) as shown in FIG. 14 and the repetition factor for the interference signal is four (RF=4) as shown in FIG. 15, based on the repetition factor (RF=2) of the interference signal, the mapping pattern of the desired signal and the mapping pattern of the interference signal are made the same I at least two symbols as described above.

Although these examples requires at least two same symbols when there is one interference signal source, at least M+1 same symbols are required when M interference signal sources are provided. In other words, when the number of interference signal sources is M, mapping patterns of a plurality of same symbols in the frequency domain are the same on at least M+1 subcarriers in the base station of the desired signal and the base stations of interference signal sources so that it is possible to cancel interference signals from all interference signal sources.

Thus, in the present embodiment, even when the repetition factor for the desired signal and the repetition factor for the interference signal is different, it is possible to cancel the interference signal from the received signal and obtain the desired signal.

(Embodiment 5)

Figure 18:
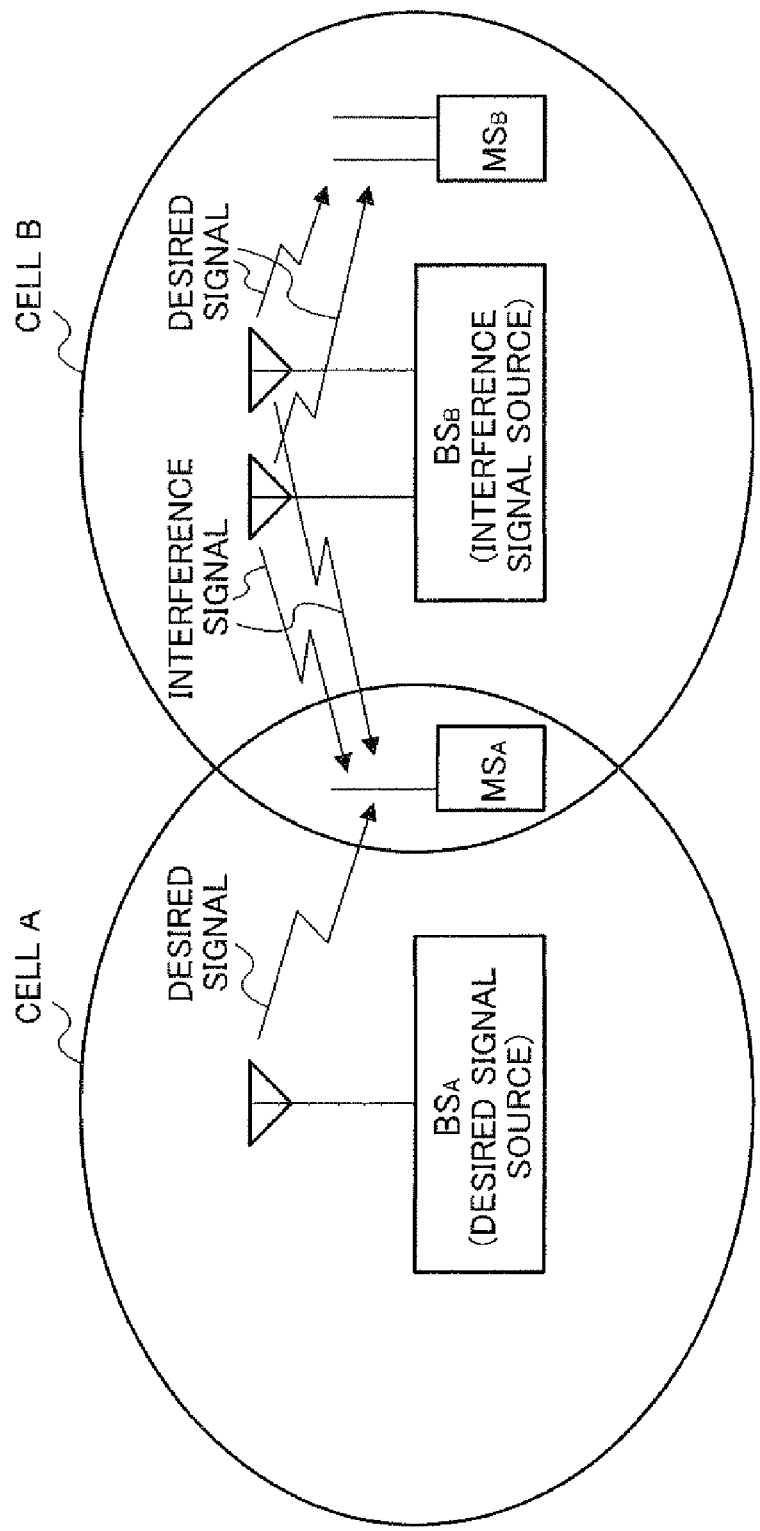
FIG. 18 is a configuration diagram of a mobile communication system according to Embodiment 5 of the present invention.

FIG. 18 shows a configuration of a mobile communication system according to the present embodiment. As shown in FIG. 18, the present embodiment include the mobile station $MS_A$ that is communicating with the base station $BS_A$ and is located near the cell boundary of cell A. Further, the case is described where a cell adjacent to cell A is cell B. Accordingly, in FIG. 18, for mobile station $MS_A$, the base station $BS_A$ is a desired signal source and the base station $BS_B$ is an interference signal source. In other words, a signal transmitted to the mobile station $MS_A$ located in cell A from the base station $BS_A$ is a desired signal for mobile station $MS_A$, and a signal transmitted to the mobile station $MS_B$ located in cell B from the base station $BS_B$ is a desired signal for the mobile station $MS_B$ and an interference signal to the mobile station $MS_A$. Further, in the present embodiment, the base station $BS_B$ (interference signal source) and the mobile station $MS_B$ have a plurality of antennas (two in FIG. 18), and perform MIMO (Multi Input Multi Output) communication. In such a mobile communication system, it is possible at mobile station $MS_A$ to cancel the interference signal in the same way as described above.

Figure 19:
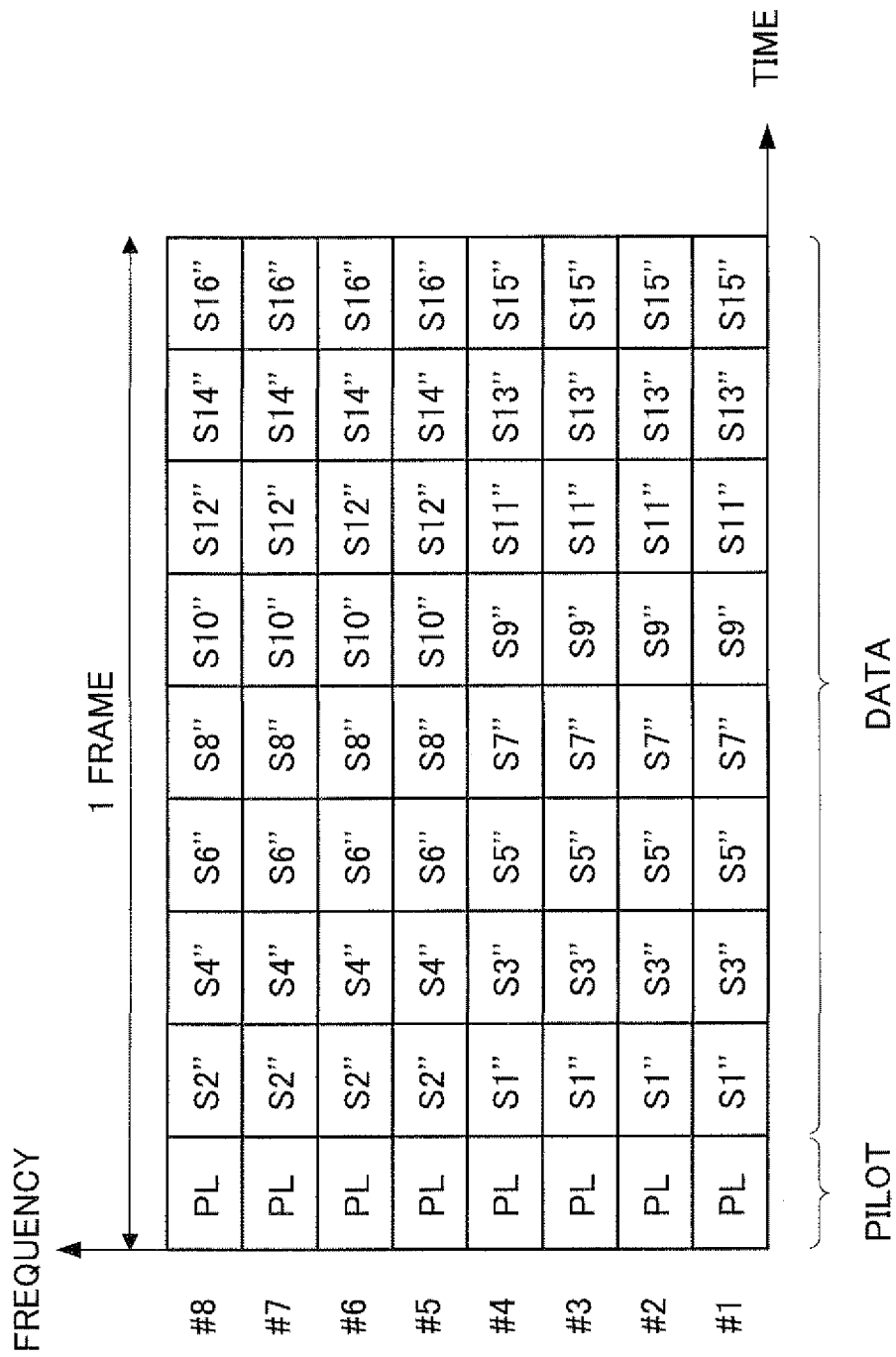
FIG. 19 is a diagram showing a mapping pattern according to Embodiment 5 of the present invention.

For example, when, in base station $BS_A$ of the desired signal source, a mapping pattern is provided as shown in FIG. 7, the base station $BS_B$ of the interference signal source provide a mapping pattern at the antenna on one side as shown in FIG. 15 and provide a mapping pattern at the antenna on the other side as shown in FIG. 19. By making the mapping pattern of the desired signal and the mapping patterns of the interference signals transmitted from two antennas the same in the frequency domain, even when the base station $BS_B$ of the interference signal source performs MIMO communication, the mobile station $MS_A$ can cancel the interference signal from the received signal in the same way as described above. When the repetition factor is L, L−1 interference signals can be canceled so that, when the base station $BS_B$ performs MIMO communication using L−1 antennas at maximum, it is possible at the mobile station $MS_A$ to cancel all the interference signals.

In addition, although a case has been described with the present embodiment where the desired signal is not subjected to MIMO transmission and the interference signal is subjected to MIMO transmission, it is possible to cancel the interference signal in the same way as described when the desired signal is subjected to MIMO transmission and the interference signal is not subjected to MIMO transmission or when both the desired signal and the interference signal are subjected to MIMO transmission.

Thus, according to the present embodiment, when the base station has a plurality of antennas and performs MIMO transmission, it is possible at the mobile station to cancel the interference signal from the received signal and obtain the desired signal.

(Embodiment 6)

Figure 20:
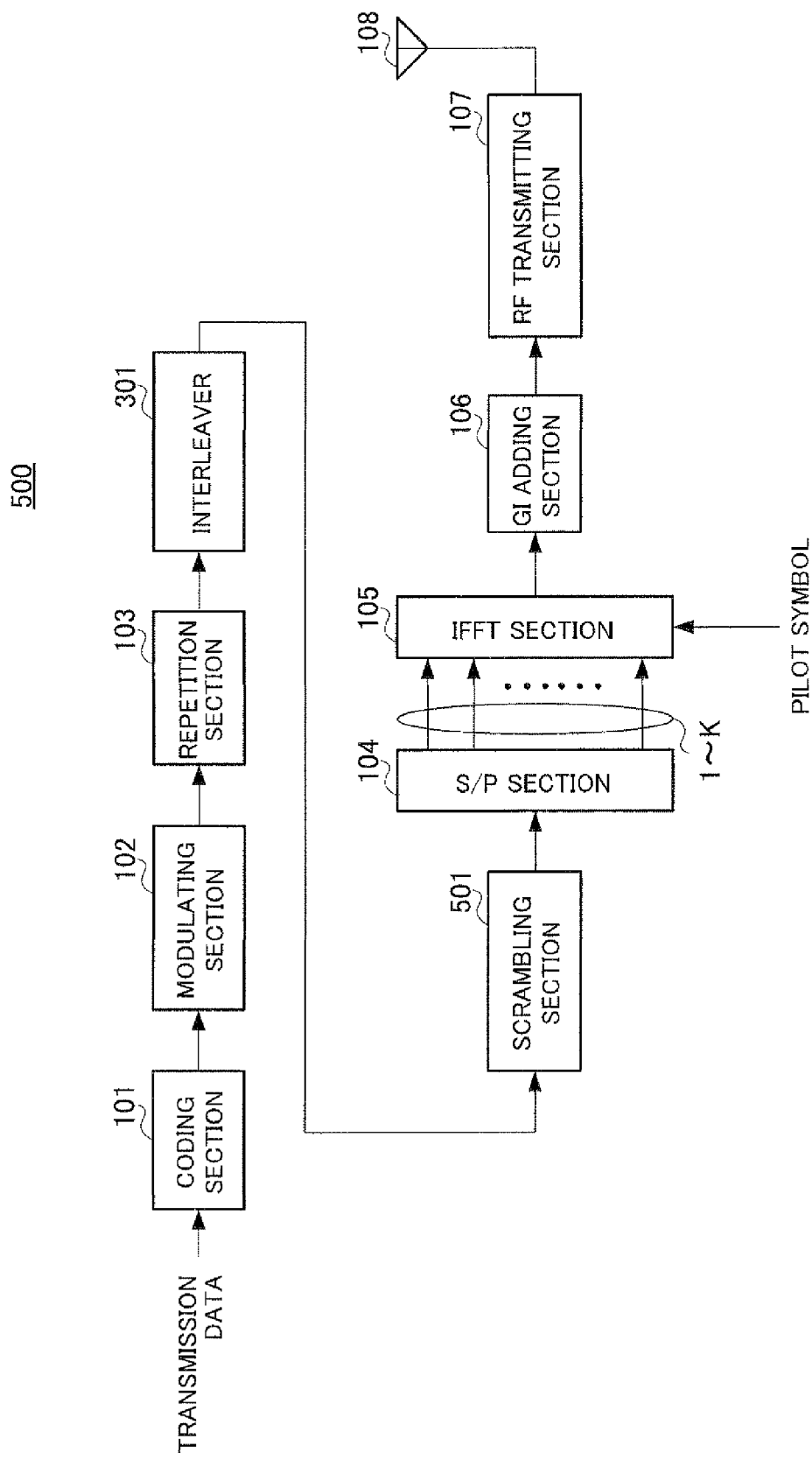
FIG. 20 is a block diagram showing a configuration of a base station according to Embodiment 6 of the present invention.

FIG. 20 shows a configuration of base station 500 according to the present embodiment. Base station 500 further provides scrambling section 501 in the configuration of base station 300 (FIG. 8) according to Embodiment 2.

Scrambling section 501 subjects an interleaved symbol to complex multiplication with one of OVSF (Orthogonal Variable Spreading Factor) code, GOLD code, PN code and rotation code to complex multiplication, and subjects symbols to scrambling processing. For example, these codes used in scrambling processing may be different per channel or per mobile station.

By performing such scrambling processing, it is possible to decrease the interference on a mobile station that receives a transmission signal from base station 500 as interference signals. Accordingly, when the mobile station that receives a transmission signal from base station 500 as an interference signal does not have the interference cancellation function as described above, the interference signal from base station 500 becomes whitened in the mobile station by scrambling processing so that it is possible to reduce the influence of interference.

Thus, according to the present embodiment, it is possible to reduce the influence of interference by scrambling processing.

(Embodiment 7)

Figure 21:
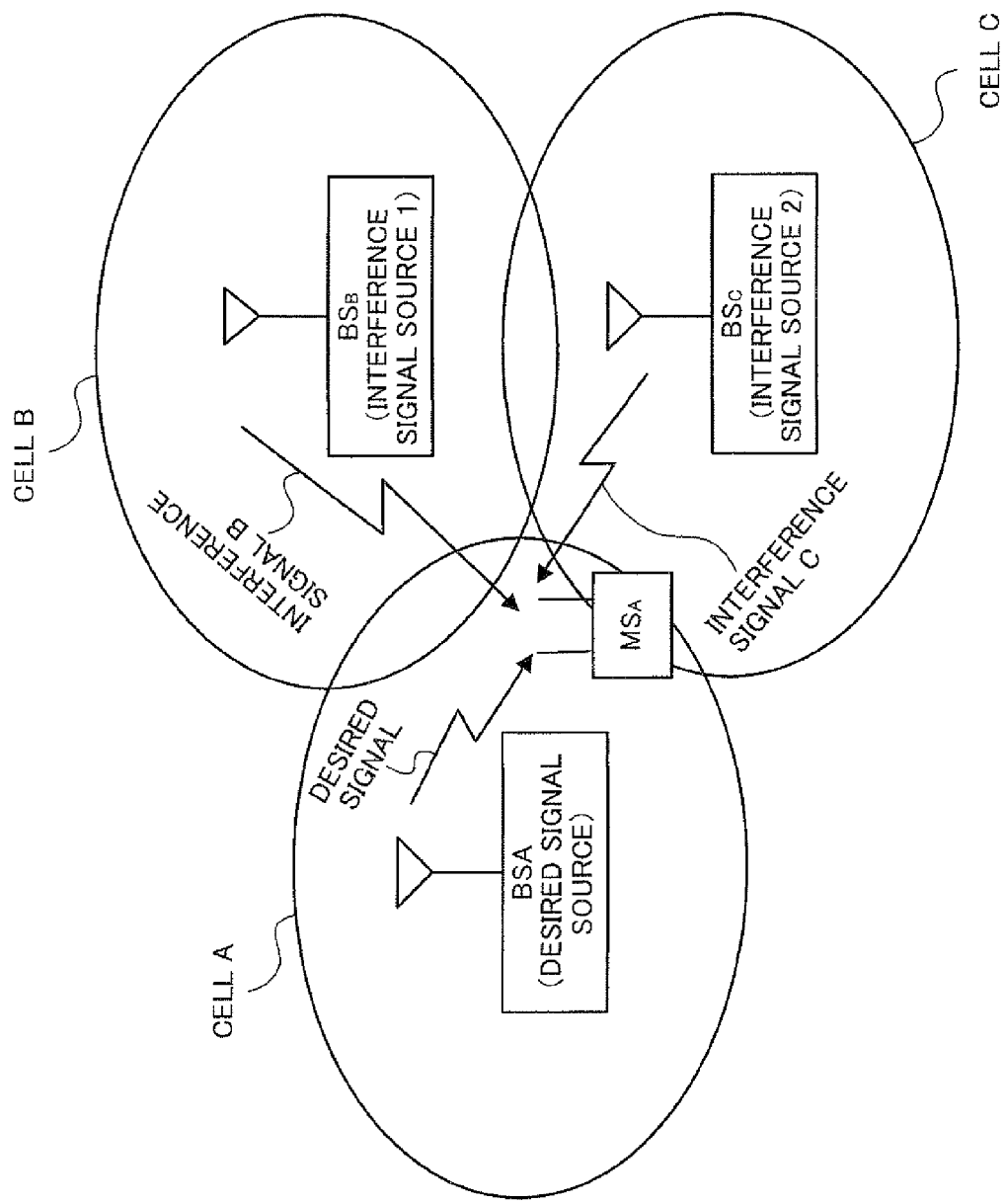
FIG. 21 is a configuration diagram showing a mobile communication system according to Embodiment 7 of the present invention.

FIG. 21 shows a configuration of a mobile communication system according to the present embodiment. As shown in FIG. 21, the present embodiment includes the mobile station $MS_A$ that is communicating with the base station $BS_A$ and is located near the cell boundary of cell A. Further, the case is described where cells adjacent to cell A are cells B and C. Accordingly, in FIG. 21, for the mobile station $MS_A$, the base station $BS_A$ is a desired signal source, and the base stations $BS_B$ and $BS_C$ are interference signal sources. In other words, a signal transmitted to the mobile station $MS_A$ located in cell A from the base station $BS_A$ is a desired signal for the mobile station $MS_A$, a signal transmitted to a mobile station located in cell B from the base station $BS_B$ is an interference signal B for the mobile station $MS_A$ and a signal transmitted to a mobile station located in cell C from the base station $BS_C$ is an interference signal C for the mobile station $MS_A$. Further, in this Embodiment, the mobile station $MS_A$ has a plurality of antennas (two in FIG. 21). In such a mobile communication system, it is possible at the mobile station $MS_A$ to cancel a plurality of interference signals (the interference signals A and B).

For example, when a mapping pattern in the base station $BS_A$ of the desired signal source is provided as shown in FIG. 7, a mapping pattern in the base station $BS_B$ of the interference signal source is provided as shown in FIG. 15 and the mapping pattern in the base station $BS_B$ is matched with the mapping pattern of the base station $BS_A$. Here, in the present embodiment, it is not necessary to match the mapping pattern of the base station $BS_C$ that is another interference signal source with the mapping pattern of the base station $BS_A$.

Thus, even when the interference signal (interference signal B) having the mapping pattern matched with the desired signal and the interference signal (interference signal C) having the mapping pattern unmatched with the desired signal are mixed, by providing mobile station $MS_A$ with a plurality of antennas, it is possible at the mobile station $MS_A$ to cancel both the interference signal B and interference signal C from the received signal.

Figure 22:
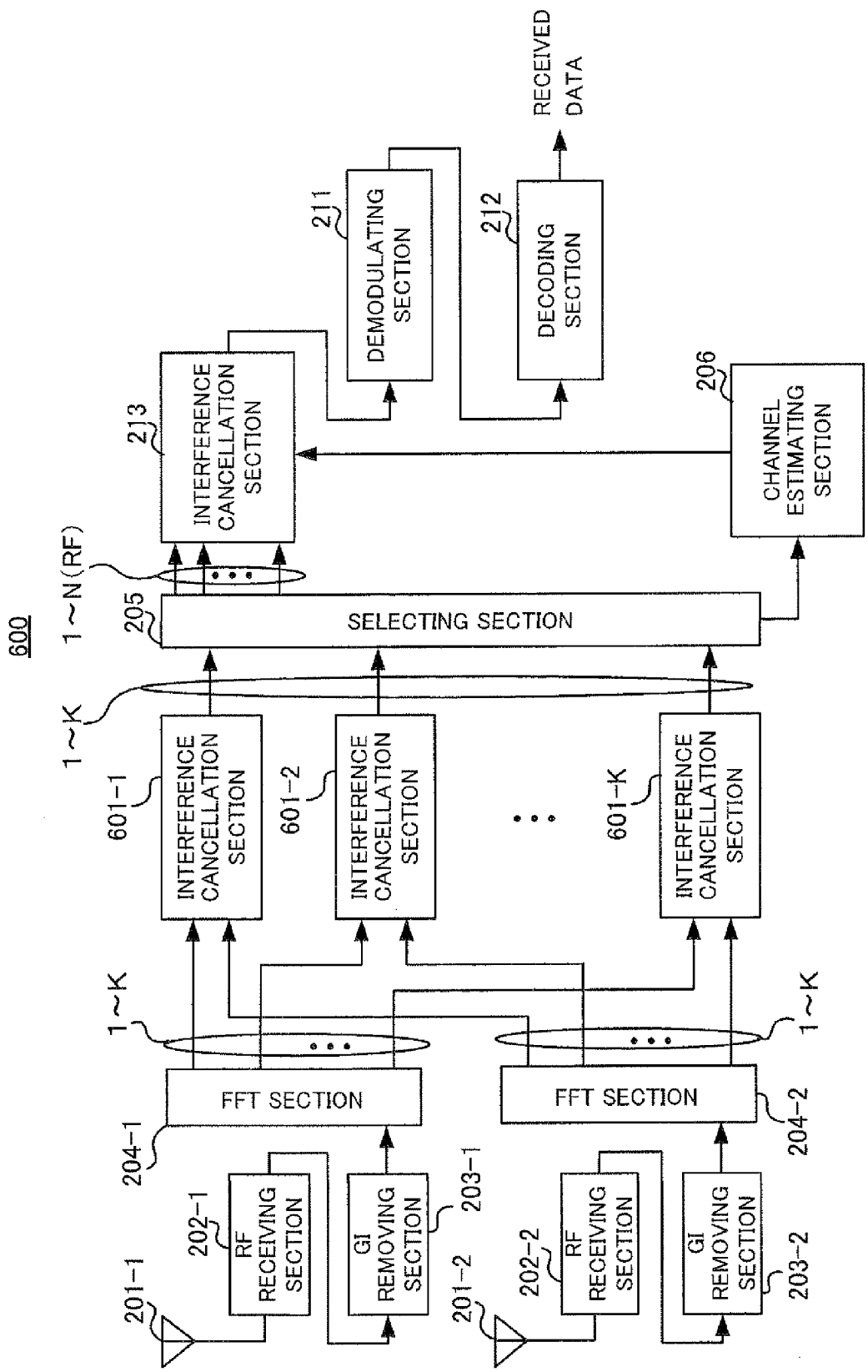
FIG. 22 is a block diagram showing a configuration of a mobile station according to Embodiment 7 of the present invention.

FIG. 22 shows a configuration of mobile station 600 according to the present embodiment. In addition, in FIG. 22, the same components as mobile station 200 (FIG. 6) according to Embodiment 1 are assigned the same reference numerals and are not described. Further, antennas 201-1 and 201-2, RF receiving sections 202-1 and 202-2, GI removing sections 203-1 and 203-2, and FFT sections 204-1 and 204-2 in FIG. 11 are the same as antenna 201, RF receiving section 202, GI removing section 203, and FFT section 204 in FIG. 6.

Mobile station 600 divides and performs interference canceling processing into two steps. In other words, as the first step, interference cancellation sections 601-1 to 601-K separate the interference signal (interference signal C) having the mapping pattern unmatched with the desired signal in the space domain, and as the second step, interference cancellation section 213 separates the interference signal (interference signal B) having the mapping pattern matched with the desired signal in the frequency domain.

Interference cancellation sections 601-1 to 601-K are provided so as to correspond to a plurality of subcarriers #1 to #K constituting an OFDM symbol and receives both a signal received at antenna 201-1 and another signal received at antenna 201-2, per subcarrier. Then, interference cancellation sections 601-1 to 601-K cancel the interference signal C from the received signal by subjecting the signals to MMSE processing in the space domain. Interference cancellation sections 601-1 to 601-K, when in canceling the interference signal C from the received signal, receive a signal (referred to as a "pseudo desired signal") combining the desired signal and interference signal B as a desired signal in MMSE processing, and subjects the symbol to MMSE processing. Only the interference signal C is first demultiplexed from the received signal by MMSE processing.

Figure 23:
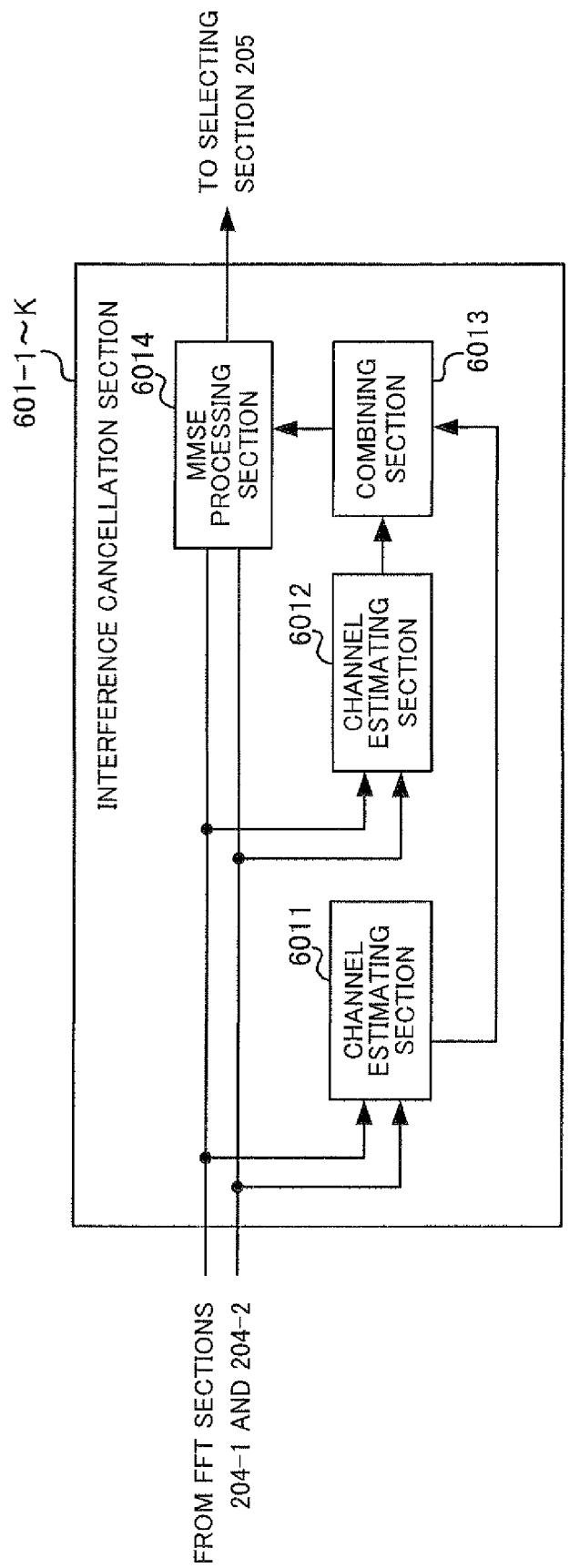
FIG. 23 is a block diagram showing a configuration of an interference cancellation section according to Embodiment 7 of the present invention.

FIG. 23 shows a configuration of interference cancellation sections 601-1 to 601-K.

Signals from FFT sections 204-1 and 204-2 are inputted to interference cancellation sections 601-1 to 601-K per subcarrier #1 to #K.

In interference cancellation sections 601-1 to 601-K, channel estimating section 6011 calculates a channel estimation value of the desired signal per antenna and outputs the calculated channel estimation value to combining section 6013.

Further, channel estimating section 6012 calculates a channel estimation value of the interference signal B per antenna and outputs the calculated channel estimation value to combining section 6013.

Combining section 6013 combines the channel estimation value of the desired signal and the channel estimation value of the interference signal B per antenna and outputs the combined channel estimation value to MMSE processing section 6014.

By this combining processing, MMSE processing 6014 can subject the pseudo desired signal as a desired signal in MMSE to MMSE processing in the space domain. Then, it is possible to extract the pseudo desired signal from the received signal (a signal where the desired signal and interference signals B and C are mixed) by this MMSE processing. In other words, it is possible to cancel the interference signal C from the received signal. Pseudo desired signals obtained in MMSE processing sections 6014 in interference cancellation sections 601-1 to 601-K are outputted to selecting section 205.

Then, as in Embodiment 1, interference cancellation section 213 cancels the interference signal B from the pseudo desired signal and extracts only the desired signal. When the repetition factor (RF) is L, L−1 interference signals can be canceled so that it is possible at the mobile station $MS_A$ to cancel all the interference signals from RF−1 (three) interference signal sources in symbols S1 to S16 with RF=4.

In addition, in the present embodiment, it is possible to reliably cancel all interference signals when the relationships of M1<N and M2<L hold, where the number of interference signal sources having the mapping pattern matched with the desired signal is M1, the number of interference signal sources having the mapping pattern unmatched with the desired signal is M2, the number of receiving antennas of the mobile station is N and the repetition factor is L.

Further, although interference canceling processing may be performed in a single step rather than in two steps in the space domain and the frequency domain, in the present embodiment, by canceling the interference signal (interference signal C) having the mapping pattern unmatched with the desired signal prior to canceling the interference signal (interference signal B) having the mapping pattern matched with the desired signal, it is possible to reduce the number of antennas and the computation amount required for canceling interference. This is because of the reason as described below.

In other words, as described above, by matching the mapping patterns of the desired signal and interference signal B, the interference signal B is extracted as a pseudo desired signal, not as an interference signal when the interference signal C is canceled from the received signal in the space domain. Thus, by extracting the interference signal B having the mapping pattern matched with the desired signal as a pseudo desired signal, the number of interference signals that should be canceled in the space domain can be reduced so that it is possible to decrease the number of antennas required for canceling interference and reduce the amount of inverse matrix operation required for canceling interference.

For example, when M1=3, M2=2, N=2 and L=4 as described above, by canceling interferences in the space domain prior to canceling interference in the frequency domain, it is possible to cancel interference signals from three interference signal sources having the mapping patterns matched with the desired signal sources using four same symbols after reliably canceling the interference signal from one interference signal source having the mapping pattern unmatched with the desired signal source using two antennas.

In other words, when interference canceling processing is performed collectively in one step 8×8 inverse matrix operation is required and as in this Embodiment, when interference canceling processing is divided and performed in two steps, 2×2 inverse matrix operation in the space domain and 4×4 inverse matrix operation in the frequency domain are only required. The inverse matrix operation increases the operation amount exponentially according to the operation size, so that it is possible to greatly reduce the operation amount by dividing and performing interference canceling processing in two steps as in the present embodiment.

Thus, according to the present embodiment, even when the interference signal having the mapping pattern matched with the desired signal and the interference signal having the mapping pattern unmatched with the desired signal are provided, it is possible at the mobile station to cancel the interference signals from the received signal and obtain the desired signal.

(Embodiment 8)

Although a case has been described with Embodiment 1 where the mapping patterns in the frequency domain in the base station of the desired signal source and the base station of the interference signal source are the same, a case will be described with the present embodiment where the mapping patterns in the time domain in the base station of the desired signal source and the base station of the interference signal source are the same.

Embodiment 1, in consideration of the fact that channel variations in the time domain are generally smaller than channel variations in the frequency domain, maps the plurality of same symbols subjected to repetition in the frequency domain (FIG. 7).

However, in an environment where a mobile station moves extremely fast and multipaths hardly occurs, channel variations in the time domain can be larger than channel variations in the frequency domain. In such a case, it is effective to map the plurality of same symbols subjected to repetition in the time domain.

Figure 24:
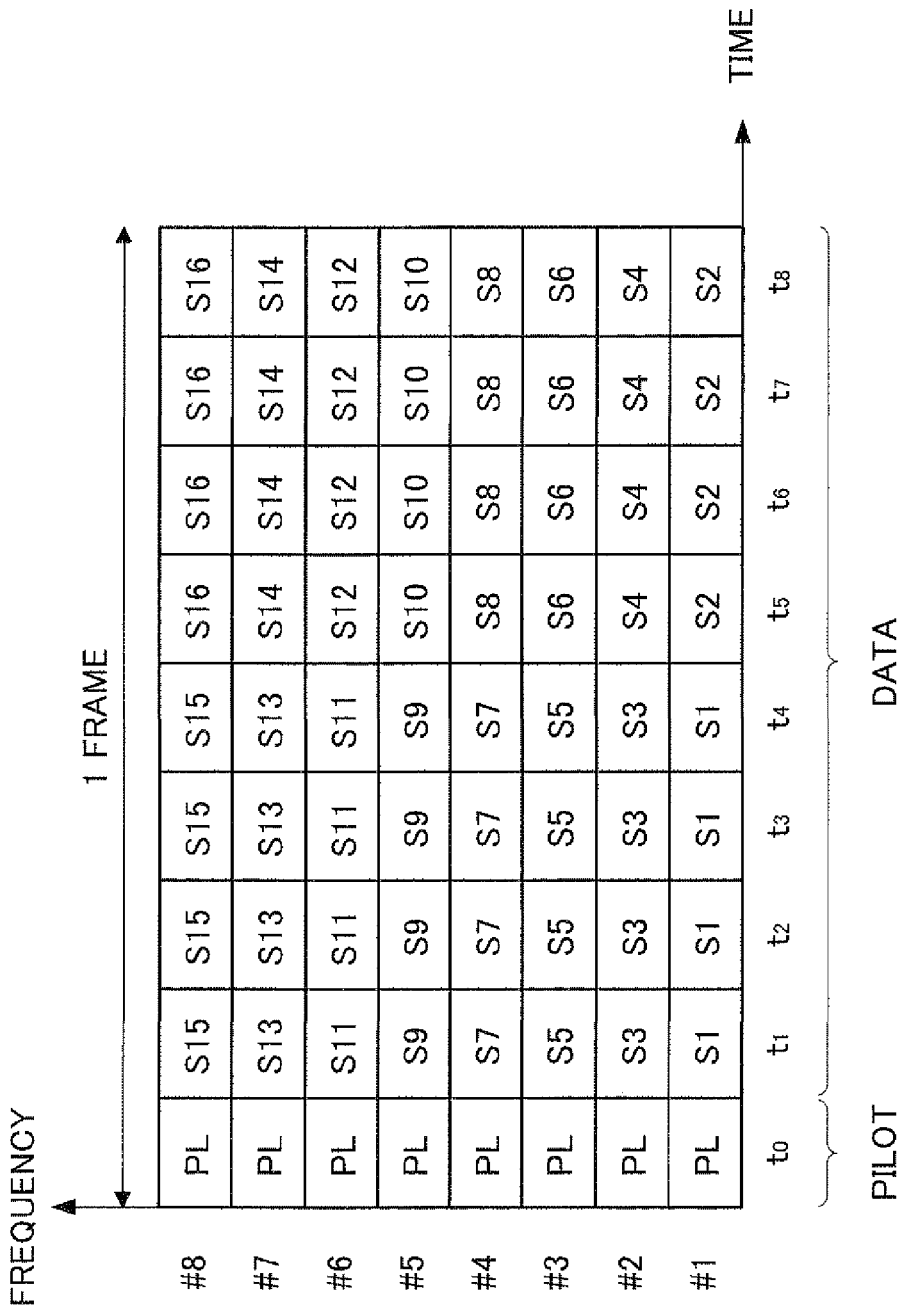
FIG. 24 is a diagram showing a mapping pattern according to Embodiment 8 of the present invention.

Therefore, in the present embodiment, the base station of the desired signal source have a mapping pattern as shown in FIG. 24: Further, the base station of the interference signal source uses a mapping pattern matched with the mapping pattern as shown in FIG. 24 as in Embodiment 1.

Figure 25:
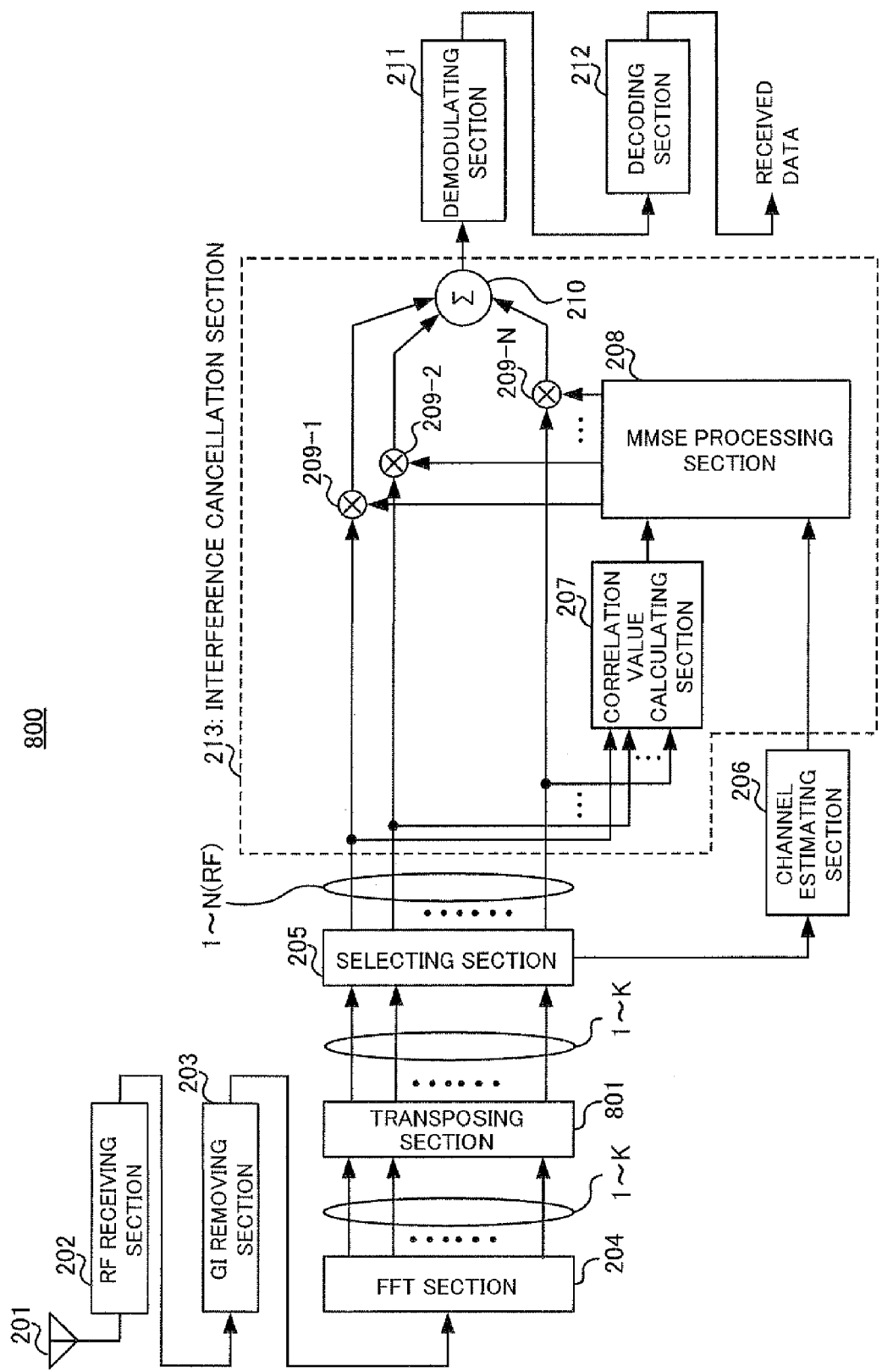
FIG. 25 is a block diagram showing a configuration of a mobile station according to Embodiment 8 of the present invention.

A mobile station receiving a signal transmitted from the base station having such a mapping pattern has a configuration as shown in FIG. 25. In other words, mobile station 800 according to the present embodiment further has transposing section 801 in mobile station 200 (FIG. 6) according to Embodiment 1. In addition, in FIG. 25, the same components as those of FIG. 6 are assigned the same reference numerals and are not described.

Transposing section 801 transposes a signal inputted from FFT section 204 between the frequency domain and the time domain. To be more specific, in the mapping pattern shown in FIG. 24, transposing section 801 transposes data portions between frequencies (subcarriers) #1 to #8 and time t1 to t8. As a result, the mapping pattern is transformed as the same one shown in FIG. 7. Data where mapping pattern is thus transformed is outputted to selecting section 205.

Here, the plurality of same symbols subjected to repetition may be interleaved in the time domain so that it is possible to further enhance the diversity effect in the time domain. Further, the plurality of same symbols subjected to repetition may be interleaved in the frequency domain so that it is possible to enhance the diversity effect in the frequency domain.

However, when mobile station 800 cancels the interference signal from the received signal and obtains the desired signal, the mapping pattern of desired signals subjected to repetition onto subcarriers and the mapping pattern of interference signals subjected to repetition onto subcarriers need to be the same in the time domain. In other words, when mobile station 800 cancels the interference signal from the received signal and obtains the desired signal, the desired signal and the interference signal needs to be arranged in the time domain according to the same mapping pattern. Accordingly, the interleaver of the desired signal source and interleaver of the interference signal source need to interleave the same symbols subjected to repetition in the time domain in the same interleaving patterns.

Figure 26:
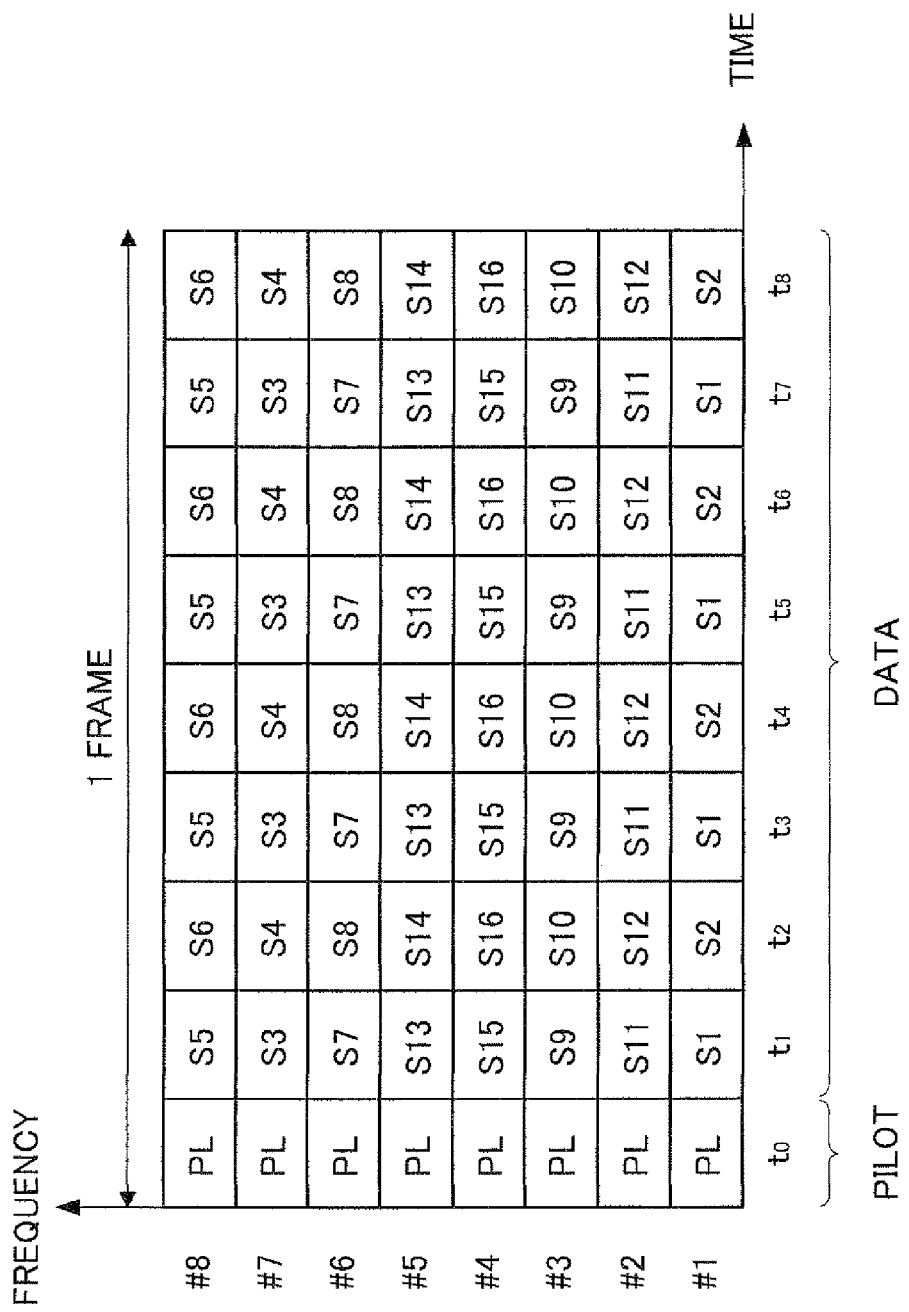
FIG. 26 is a diagram showing a mapping pattern according to Embodiment 8 of the present invention.

Therefore, as shown in FIG. 26, interleavers interleave symbols shown in FIG. 24. Then, at this point, the interleaving patterns of the desired signal and interference signal in the time domain are the same. In contrast, when interleaving is performed in the frequency domain, interleavers interleave per subcarrier (per row) without interleaving per symbol. Thus, the mapping pattern of desired signals subjected to repetition onto subcarriers and the mapping pattern of interference signals subjected to repetition onto subcarriers can be made the same in the time domain so that it is possible to reliably cancel the interference signal from the received signal.

Here, it is possible to make the interleaving patterns of the desired signal and the interference signal different when performing interleaving in the frequency domain different.

Further, it is possible to make the interleaving patterns of the desired signal and interference signal the same in the frequency domain and time domain. In this case, the mapping patterns subjected to interleaving are the same in the base station of the desired signal source and the base station of the interference signal source.

Thus, according to the present embodiment, even when the plurality of same symbols subjected to repetition is mapped in the time domain, it is possible to cancel the interference signal from the received signal.

In addition, although above embodiments use MMSE as an interference cancellation algorithm, the interference cancellation algorithm is not limited to MMSE and may use algorithms that are interference cancellation algorithms used in the AAA technique. For example, it is possible to use, for example, null steering, beam forming, LMS, RLS and CMA.

Further, it is possible to use the stream division algorithm used in MIMO communication. When the stream division algorithm used in MIMO communication is used, it is possible to obtain the following effect.

That is, mobile communication systems increasingly need to perform MIMO reception for enabling fast transmission of data rate and may use the stream division algorithm not only for the stream division algorithm in MIMO reception processing, but also for interference canceling processing by using the stream division algorithm as the interference cancellation algorithm so that it is possible to simplify the circuit configuration of the receiver. Further, by using the stream division algorithm as the interference cancellation algorithm, it eliminates the necessity of operation of the cross-correlation matrix required for using MMSE so that it is possible to cancel interference signals reliably when the number of symbols of the received signal is small. Furthermore, it is possible to switch adaptively between MIMO reception processing and interference canceling processing according to the propagation environment between the base station and mobile station or the distance between the base station and the mobile station. For example, when the mobile station is located relatively near the base station and is moving at low speed, it is possible to improve transmission rate by using the stream division algorithm and performing MIMO reception processing, and when the mobile station is located at the cell edge or sector edge, it is possible to improve SINR by performing interference canceling processing of the present invention using the stream division algorithm.

Further, although MIMO reception processing calculates stream division weights using channel estimation values per stream and per antenna, when interference canceling processing is performed using the stream division algorithm, stream division weights may be calculated using channel estimation values per transmitting station and per subcarrier.

Further, although cases have been described with above embodiments where the mobile station that is a receiving station has one or two antennas, it is possible to combine the present invention with a radio receiving apparatus having three antennas or more. For example, when a radio receiving apparatus includes the number of antennas as N and the repetition factor as L, it is possible to cancel N×L−1 interference signals by applying the invention. In other words, it is possible in the present invention to apply radio communication systems where the sum of the number of the desired signal source and the number of interference signal sources is N×L at the maximum.

Further, although cases have been described with the above embodiments where the base station is a transmitting station (radio transmitting apparatus) and the mobile station is a receiving station (radio receiving station), it is possible to implement the present invention as described above when the mobile station is a transmitting station (radio transmitting apparatus) and the base station is a receiving station (radio receiving station). For example, when the base station receives a desired signal from a mobile station of a desired signal source and receives an interference signal from a mobile station of an interference signal source simultaneously, it is possible to cancel the interference signal from the received signal and obtain the desired signal as described above. That is, the invention is also applicable to the uplink in the same way as the downlink.

Also, the base station, mobile station and subcarrier may be referred to as Node B, UE and tone.

Moreover, although cases have been described with the above embodiments where a communication area that one base station covers is referred to as a "cell" and an area obtained by dividing the cell into a plurality of areas in the angular direction is referred to as a "sector", communication systems may provide a communication area that one base station covers and is referred to as a "cell site" and an area obtained by dividing the cell site into a plurality of areas in the angular direction and is referred to as a "cell". The invention is applicable to such communication systems.

Further, although cases have been described with above embodiments where symbols are mapped in subcarrier units, it is possible to implement the present invention in communication systems where a plurality of subcarriers are collectively referred to as a sub-block or resource block by performing symbol mapping in sub-block units or resource block units.

Moreover, cases have been described with above embodiments as an example where the present invention is configured using hardware but it is also possible to implement the present invention using software.

Each function block employed in the description of each of the aforementioned embodiments may typically be implemented as an LSI constituted by an integrated circuit. These may be individual chips or partially or totally contained on a single chip.

"LSI" is adopted here but this may also be referred to as "IC", "system LSI", "super LSI", or "ultra LSI" due to differing extents of integration.

Further, the method of circuit integration is not limited to LSIT's, and implementation using dedicated circuitry or general purpose processors is also possible. After LSI manufacture, utilization of an FPGA (Field Programmable Gate Array) or a reconfigurable processor where connections and settings of circuit cells within an LSI can be reconfigured is also possible.

Moreover, if integrated circuit technology comes out to replace LSI's as a result of the advancement of semiconductor technology or a derivative other technology, it is naturally also possible to carry out function block integration using this technology. Application of biotechnology is also possible.

The present application is based on Japanese Patent Application No. 2004-381796, filed on Dec. 28, 2004, Japanese Patent Application No. 2005-188424, filed on Jun. 28, 2005 and Japanese Patent Application No. 2005-213930, filed on Jul. 25, 2005, the entire content of which is expressly incorporated by reference herein.

Industrial Applicability

The present invention is preferably used in, for example, a base station and mobile station used in a mobile communication system.

The invention claimed is:

1. A transmission apparatus for transmitting a transmission signal to a reception apparatus using a plurality of subcarriers, the transmission apparatus comprising:
a modulator that modulates a bit to generate a symbol;
a repetition unit that duplicates the generated symbol to generate a plurality of same symbols; and
a mapper that maps each of the plurality of same symbols onto the plurality of subcarriers in at least one of a frequency domain and a time domain, to generate the transmission signal, wherein:
a position of each of the plurality of subcarriers onto which the plurality of same symbols are mapped is common between the transmission apparatus belonging to a first cell or a first sector and another transmission apparatus belonging to a second cell which is a neighbor cell of the first cell or a second sector which is a neighbor sector of the first sector, and
wherein when a repetition factor in the transmission apparatus is different from a repetition factor in the other transmission apparatus, at least two symbols among the plurality of same symbols are mapped onto at least two subcarriers, positions of the at least two subcarriers being common between the transmission apparatus and the other transmission apparatus.

2. The transmission apparatus according to claim 1, wherein when a repetition factor in the transmission apparatus is same as a repetition factor in the other transmission apparatus, the plurality of same symbols are mapped onto the plurality of subcarriers in one OFDM symbol, positions of the plurality of subcarriers in the one OFDM symbol being common between the transmission apparatus and the other transmission apparatus.

3. The transmission apparatus according to claim 1, further comprising a plurality of antennas, and wherein a position of each of the plurality of subcarriers onto which the plurality of same symbols are mapped and that are transmitted via each of the plurality of antennas, is common between the transmission apparatus and the other transmission apparatus.

4. The transmission apparatus according to claim 1, wherein the plurality of same symbols are mapped onto the plurality of subcarriers on the basis of same symbol in the frequency domain, and mapped onto the plurality of subcarriers on the basis of OFDM symbol in the time domain, positions of the plurality of subcarriers onto which the plurality of same symbols are mapped being common between the transmission apparatus and the other transmission apparatus.

5. The transmission apparatus according to claim 1, wherein the plurality of same symbols are mapped onto the plurality of subcarriers on the basis of same symbol in the time domain, and mapped onto the plurality of subcarriers on the basis of subcarrier in the frequency domain, positions of the plurality of subcarriers onto which the plurality of same symbols are mapped being common between the transmission apparatus and the other transmission apparatus.

6. The transmission apparatus according to claim 1, wherein a repetition factor is set based on a number of second cells or second sectors.

7. A transmission method performed by a transmission apparatus for transmitting a transmission signal to a reception apparatus using a plurality of subcarriers, the transmission method comprising:
modulating a bit to generate a symbol;
duplicating the generated symbol to generate a plurality of same symbols;
mapping each of the plurality of same symbols onto the plurality of subcarriers in at least one of a frequency domain and a time domain, to generate the transmission signal; and
transmitting the generated transmission signal to the reception apparatus, wherein
a position of each of the plurality of subcarriers onto which the plurality of same symbols are mapped is common between the transmission apparatus belonging to a first cell or a first sector and another transmission apparatus belonging to a second cell which is a neighbor cell of the first cell or a second sector which is a neighbor sector of the first sector, and
wherein when a repetition factor in the transmission apparatus is different from a repetition factor in the other transmission apparatus, at least two symbols among the plurality of same symbols are mapped onto at least two subcarriers, positions of the at least two subcarriers being common between the transmission apparatus and the other transmission apparatus.

* * * * *

UNITED STATES PATENT AND TRADEMARK OFFICE
CERTIFICATE OF CORRECTION

| | | |
|---|---|---|
| PATENT NO. | : 8,401,100 B2 | Page 1 of 1 |
| APPLICATION NO. | : 13/316249 | |
| DATED | : March 19, 2013 | |
| INVENTOR(S) | : Kenichi Miyoshi et al. | |

It is certified that error appears in the above-identified patent and that said Letters Patent is hereby corrected as shown below:

In the Claims

Claim 5, column 20, line 29 incorrectly reads:

"plurality of subcaniers on the basis of same symbol in the time"

and should read:

"plurality of subcarriers on the basis of same symbol in the time".

Claim 5, column 20, line 32 incorrectly reads:

"plurality of subcaniers onto which the plurality of same sym-"

and should read:

"plurality of subcarriers onto which the plurality of same sym-".

Signed and Sealed this
Fifteenth Day of April, 2014

Michelle K. Lee
*Deputy Director of the United States Patent and Trademark Office*